United States Patent
Ito et al.

(10) Patent No.: US 9,069,156 B2
(45) Date of Patent: Jun. 30, 2015

(54) ZOOM LENS AND IMAGE PICKUP APPARATUS HAVING THE SAME

(71) Applicant: CANON KABUSHIKI KAISHA, Tokyo (JP)

(72) Inventors: Daisuke Ito, Utsunomiya (JP); Akihiko Yuki, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 100 days.

(21) Appl. No.: 13/895,493

(22) Filed: May 16, 2013

(65) Prior Publication Data

US 2013/0308043 A1 Nov. 21, 2013

(30) Foreign Application Priority Data

May 21, 2012 (JP) ................................. 2012-115551
May 21, 2012 (JP) ................................. 2012-115552

(51) Int. Cl.
| | |
|---|---|
| *H04N 5/347* | (2011.01) |
| *G02B 15/14* | (2006.01) |
| *H04N 5/232* | (2006.01) |
| *G02B 15/173* | (2006.01) |

(52) U.S. Cl.
CPC ............ *G02B 15/14* (2013.01); *H04N 5/23296* (2013.01); *G02B 15/173* (2013.01)

(58) Field of Classification Search
CPC .......................... H04N 5/23296; G02B 13/009
USPC ........... 348/240.99, 240.1, 240.2, 240.3, 340, 348/345, 347, 360, 335
See application file for complete search history.

(56) References Cited

U.S. PATENT DOCUMENTS

| | | | |
|---|---|---|---|
| 6,829,102 B2 * | 12/2004 | Ohashi et al. | 359/689 |
| 7,679,837 B2 * | 3/2010 | Souma | 359/690 |
| 8,248,708 B2 * | 8/2012 | Hayakawa et al. | 359/689 |

FOREIGN PATENT DOCUMENTS

| | | |
|---|---|---|
| JP | 2004-117826 A | 4/2004 |
| JP | 2010-32700 A | 2/2010 |
| JP | 2010-91788 A | 4/2010 |

* cited by examiner

*Primary Examiner* — Ahmed A Berhan
(74) *Attorney, Agent, or Firm* — Carter, DeLuca, Farrell & Schmidt, LLP

(57) ABSTRACT

A zoom lens includes, in order from an object side to an image side, a first lens unit having a positive refractive power, a second lens unit having a negative refractive power, an aperture stop, a third lens unit having a positive refractive power, and a rear lens group including at least one lens unit, the first lens unit is positioned closer to the object side at a telephoto end than at a wide-angle end, the third lens unit includes at least one positive lens, and a partial dispersion ratio θgF3P of a material of one positive lens in the third lens unit, Abbe's number vd3P, focal lengths fW and fT of a total system at the wide-angle end and the telephoto end respectively, a focal length f1 of the first lens unit, and a focal length f3 of the third lens unit are appropriately set.

20 Claims, 11 Drawing Sheets

ZOOM LENS AND IMAGE PICKUP APPARATUS HAVING THE SAME

BACKGROUND OF THE INVENTION

1. Field of the Invention

The present invention relates to a zoom lens and an image pickup apparatus having the zoom lens, and the zoom lens is suitably used for an image pickup apparatus using a solid-state image pickup element or an image pickup apparatus such as a camera using a silver-salt film.

2. Description of the Related Art

As an image pickup optical system that is used for an image pickup apparatus, a small-size zoom lens having a short total lens length with a wide angle of field and a high zoom ratio is required. A high-resolution zoom lens in which a chromatic aberration, as well as a monochromatic aberration such as a spherical aberration or a coma aberration, is appropriately corrected is also required.

A positive-lead type zoom lens that includes, in order from an object side to an image side, first, second, and third lens units having positive, negative, and positive, respectively, and a rear lens group including at least one lens unit is known.

With respect to a positive-lead type zoom lens having four units, the zoom lens for which an anomalous dispersion material is used for a material of positive lenses of a first lens unit and a third lens unit and a chromatic aberration is appropriately corrected is known (Japanese Patent Laid-Open No. 2010-91788).

With respect to a zoom lens having five units configured by lens units having positive, negative, positive, negative, and positive refractive powers in order from the object side, the zoom lens that uses a lens configured by a material having an anomalous dispersion as the third lens unit is known (Japanese Patent Laid-Open No. 2010-32700).

In addition, a zoom lens with a wide angle of field and a high zoom ratio which is configured by five lens units having positive, negative, positive, positive, and positive refractive powers in order from the object side to the image side is known (Japanese Patent Laid-Open No. 2004-117826).

It is relatively easy for the positive-lead type zoom lens to reduce a size of a total system and achieve the wide angle of field and the high zoom ratio. However, in most of the positive-lead type zoom lenses, a lot of secondary spectra of an axial chromatic aberration are generated in a zoom area at the telephoto end when a focal length at the telephoto end is increased so as to achieve the high zoom ratio.

In order to reduce the chromatic aberration, it is effective to use a lens configured by a material with a low dispersion and an anomalous dispersion at an appropriate position in the zoom lens. In addition, it is important to optimize each lens unit constituting the zoom lens based on characteristics of materials (Abbe's number or a partial dispersion ratio).

In particular, in a positive-lead type zoom lens configured by four units or five units, it is important to appropriately set a refractive power or a lens configuration of the first lens unit or the third lens unit. In addition, it is important to appropriately set a moving amount of the first lens unit or the third lens unit in zooming.

For example, when a long focal length where a focal length at the telephoto end is over 1000 mm for a converted focal length by the zoom lens using a silver-salt film is included, it is difficult to reduce the axial chromatic aberration only by using a glass material having the anomalous dispersion as the first lens unit.

In order to reduce the axial chromatic aberration at the telephoto end, it is preferred a glass material with the anomalous dispersion is used as each of positive lenses of the first lens unit and the third lens unit. However, when the glass material is used as each of the positive lenses of the first lens unit and the third lens unit, a chromatic aberration of magnification is increased at the wide-angle end.

SUMMARY OF THE INVENTION

The present invention provides a zoom lens and an image pickup apparatus having the zoom lens capable of reducing a chromatic aberration at a telephoto end, having a wide angle of field and a high zoom ratio, and capable of obtaining good optical characteristics over an entire zoom range.

A zoom lens as one aspect of the present invention changes a distance between adjacent lens units in zooming, the zoom lens includes, in order from an object side to an image side, a first lens unit having a positive refractive power, a second lens unit having a negative refractive power, an aperture stop, a third lens unit having a positive refractive power, and a rear lens group including at least one lens unit, the first lens unit is positioned closer to the object side at a telephoto end than at a wide-angle end, the third lens unit includes at least one positive lens, and a partial dispersion ratio $\theta gF3P$ of a material of one positive lens in the third lens unit, Abbe's number $\nu d3P$ of the positive lens, focal lengths $fW$ and $fT$ of a total system at the wide-angle end and at the telephoto end respectively, a focal length $f1$ of the first lens unit, and a focal length $f3$ of the third lens unit are appropriately set.

A zoom lens another aspect of the present invention changes a distance between adjacent lens units in zooming, the zoom lens includes, in order from an object side to an image side, a first lens unit having a positive refractive power, a second lens unit having a negative refractive power, an aperture stop, a third lens unit having a positive refractive power, and a rear lens group including at least one lens unit, the first lens unit and the aperture stop are positioned closer to the object side at a telephoto end than at a wide-angle end, the third lens unit includes at least one positive lens, and a partial dispersion ratio $\theta gF3P$ of a material of one positive lens in the third lens unit, Abbe's number $\nu d3P$ of the positive lens, a focal length $fT$ of a total system at the telephoto end, and a focal length $f3$ of the third lens unit are appropriately set.

Further features and aspects of the present invention will become apparent from the following description of exemplary embodiments with reference to the attached drawings.

DESCRIPTION OF THE EMBODIMENTS

Exemplary embodiments of the present invention will be described below with reference to the accompanied drawings. A zoom lens of the present invention is, in order from an object side to an image side, configured by a first lens unit having a positive refractive power (an optical power is equal to an inverse of a focal length), a second lens unit having a negative refractive power, an aperture stop, a third lens unit having a positive refractive power, and a rear lens group including one or more lens units. A distance between adjacent lens units changes in zooming.

Figure 1:
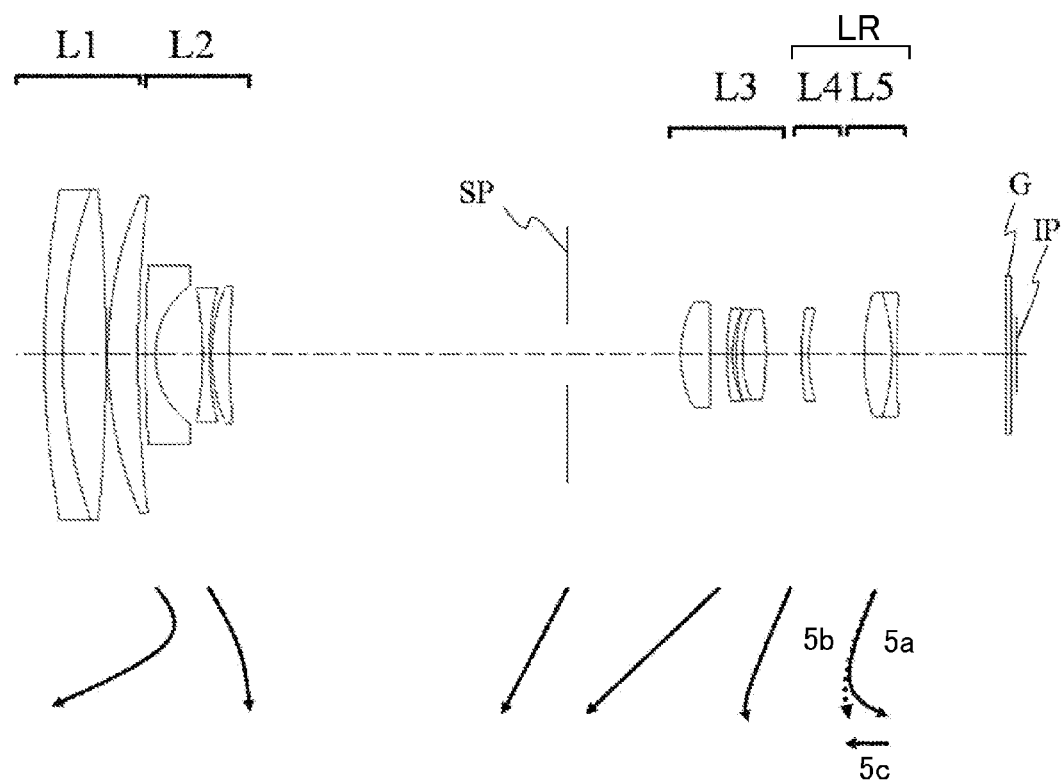
FIG. 1 is a cross-sectional diagram of lenses constituting a zoom lens in Embodiment 1 of the present invention.
Figure 2A:
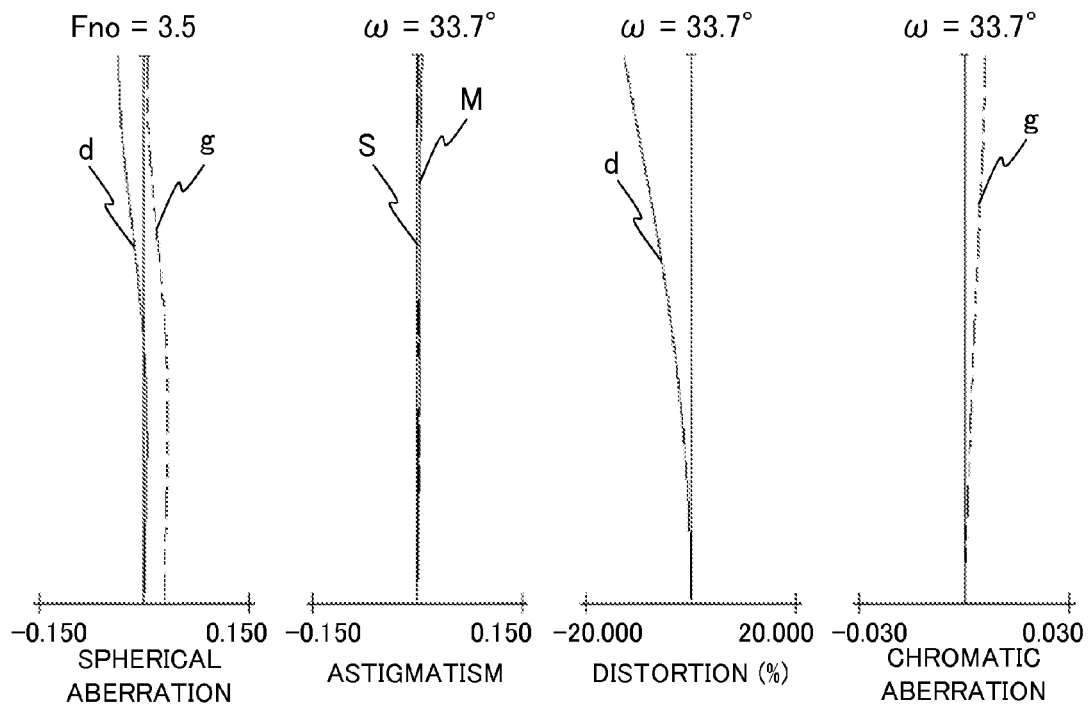
FIGS. 2A to 2C are aberration diagrams of the zoom lens at a wide-angle end, at an intermediate zoom position, and at a telephoto end, respectively, in Embodiment 1 of the present invention.
Figure 2B:
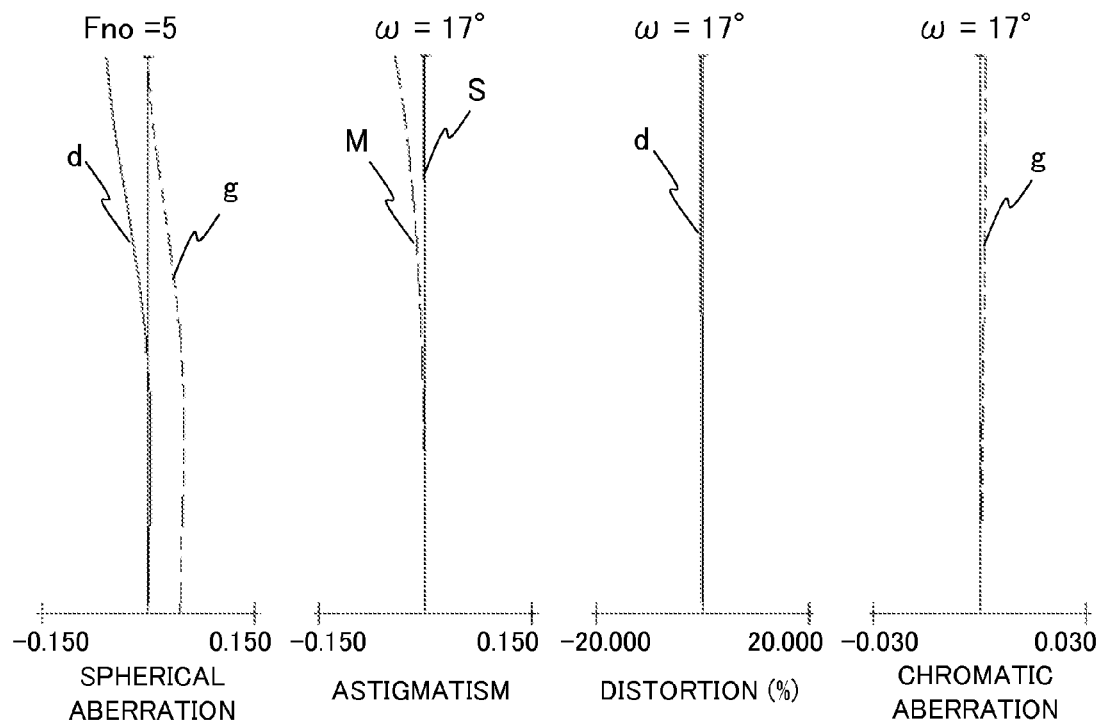
Figure 2C:
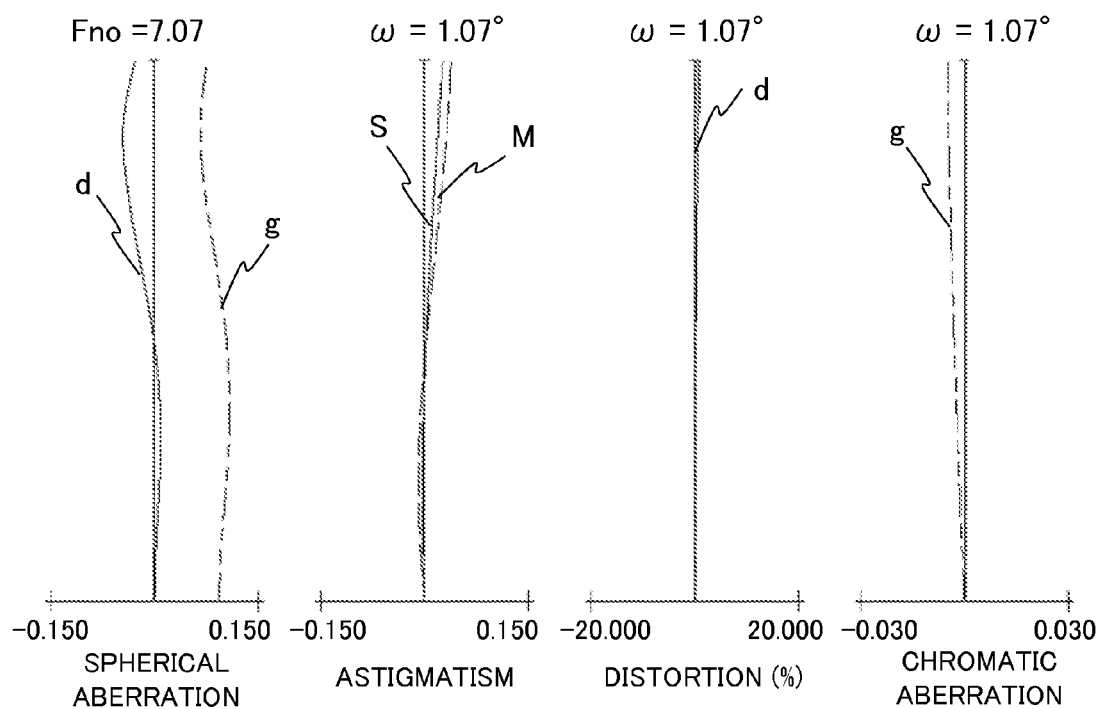

FIG. 1 is a diagram of lenses of a zoom lens at a wide-angle end (a short focal length end) in Embodiment 1 of the present invention. FIGS. 2A to 2C are aberration diagrams of the zoom lens at the wide-angle end, at an intermediate zoom position, and at a telephoto end (a long focal length end), respectively, in Embodiment 1. Embodiment 1 describes the zoom lens that has a zoom ratio of around 41.6 and an aperture ratio of around 3.50 to 7.07.

Figure 3:
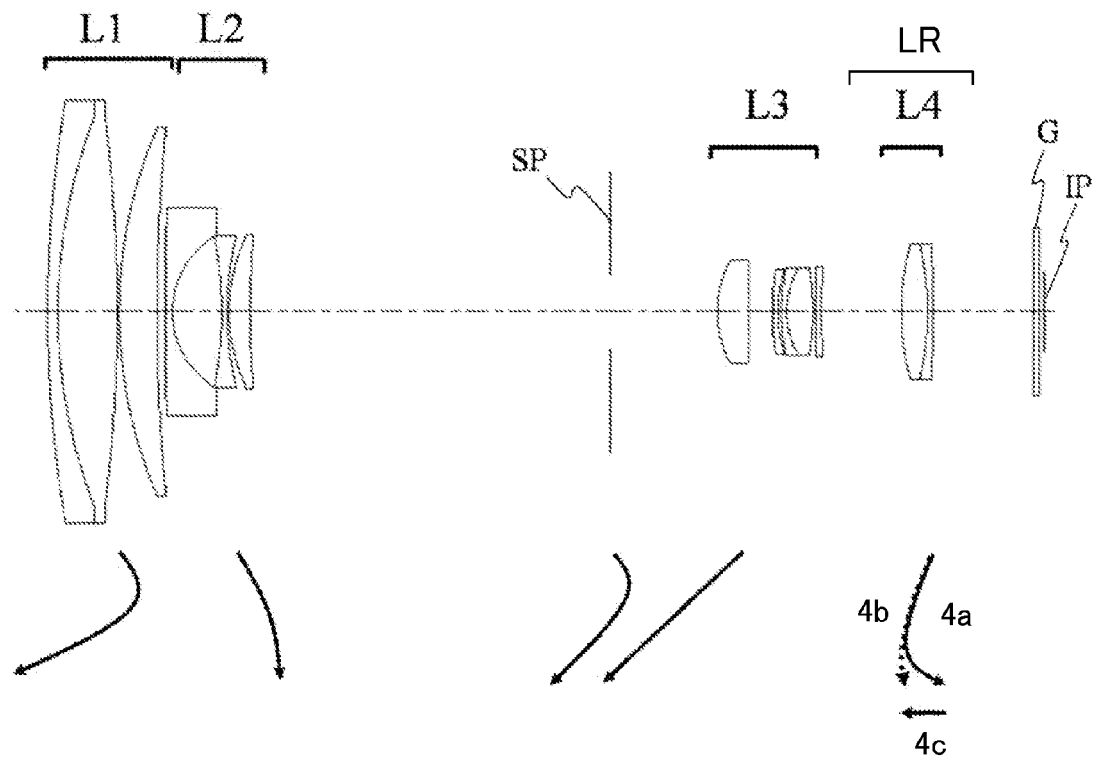
FIG. 3 is a cross-sectional diagram of lenses of a zoom lens in Embodiment 2 of the present invention.
Figure 4A:
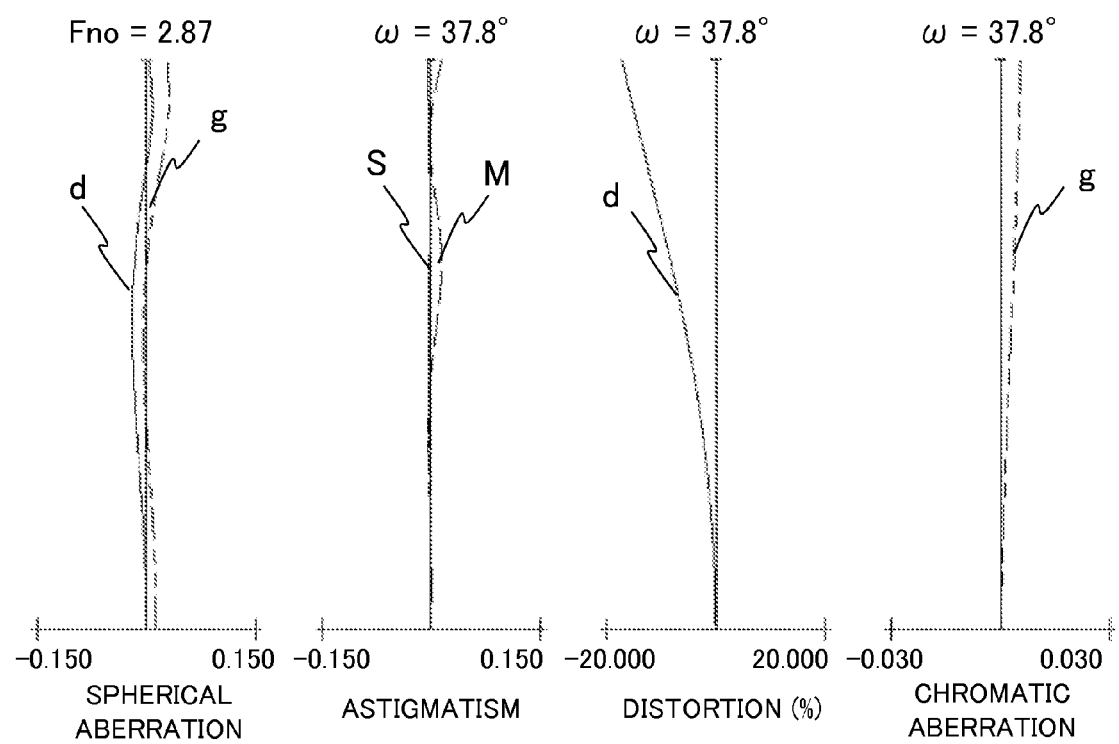
FIGS. 4A to 4C are aberration diagrams of the zoom lens at a wide-angle end, at an intermediate zoom position, and at a telephoto end, respectively, in Embodiment 2 of the present invention.
Figure 4B:
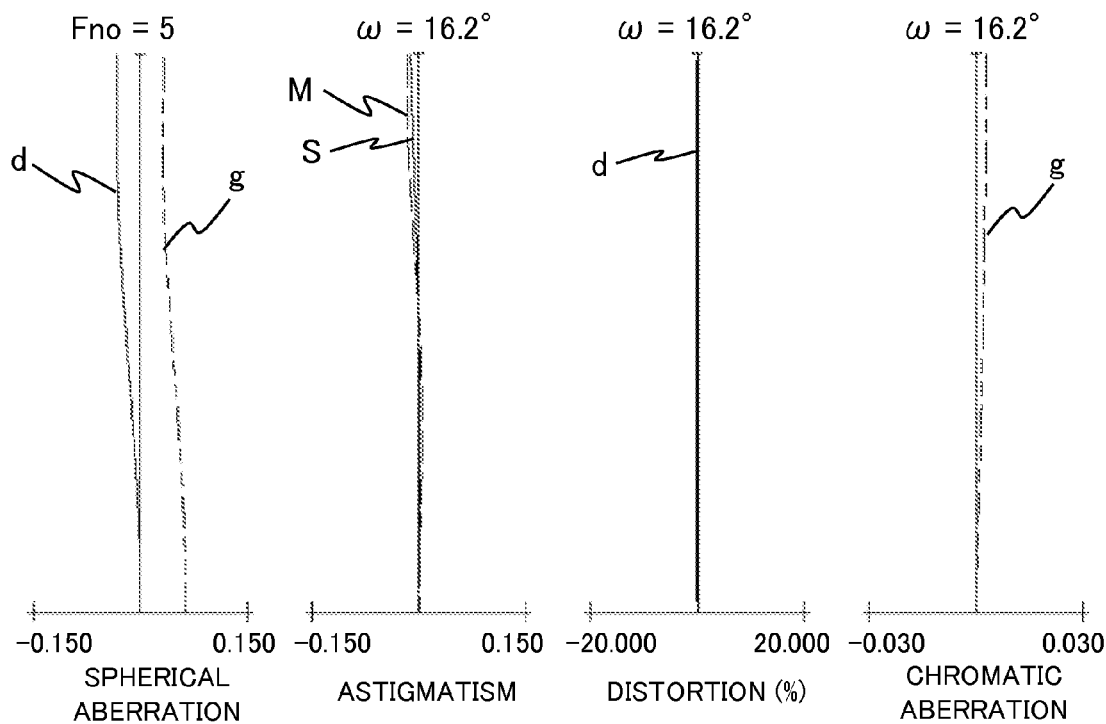
Figure 4C:
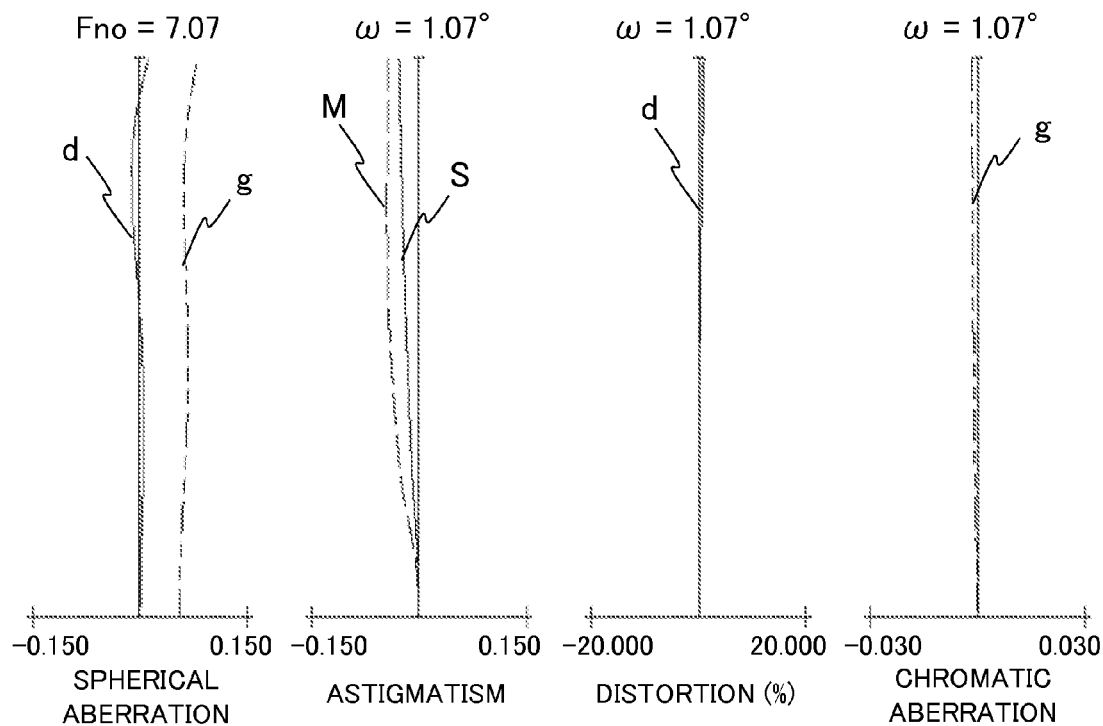

FIG. 3 is a diagram of lenses of a zoom lens at the wide-angle end in Embodiment 2 of the present invention. FIGS. 4A to 4C are aberration diagrams of the zoom lens at the wide-angle end, at the intermediate zoom position, and at the telephoto end, respectively, in Embodiment 2. Embodiment 2 describes the zoom lens that has a zoom ratio of around 48.4 and an aperture ratio of around 2.87 to 7.07.

Figure 5:
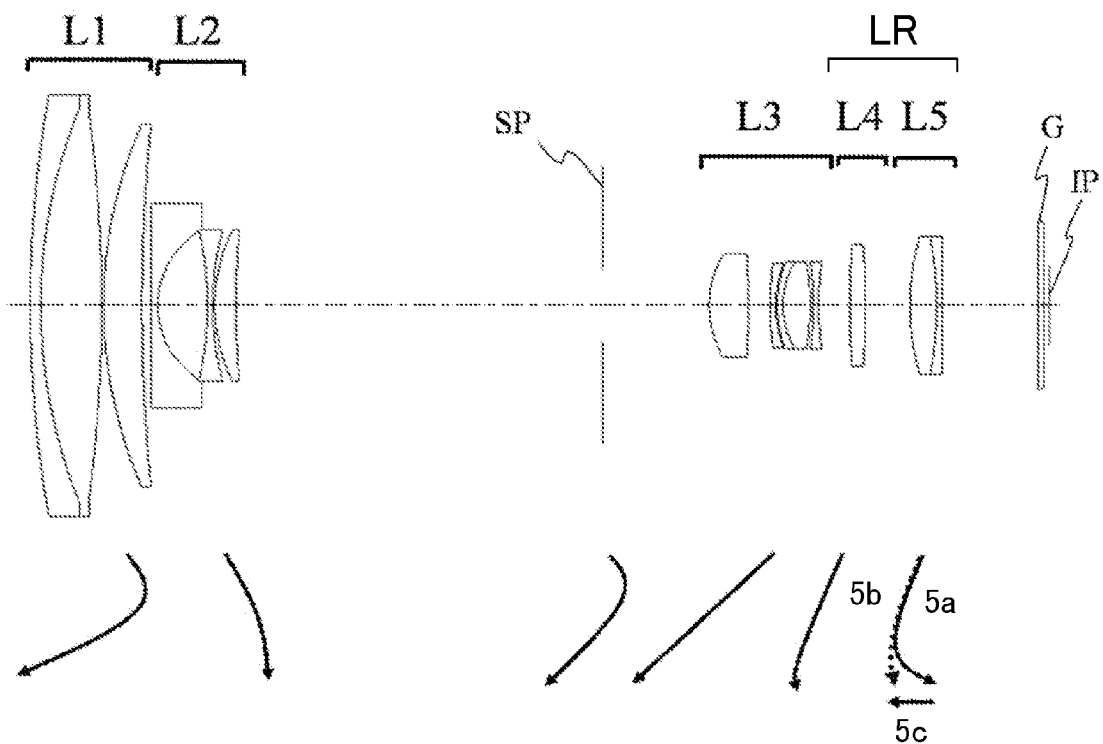
FIG. 5 is a cross-sectional diagram of lenses of a zoom lens in Embodiment 3 of the present invention.
Figure 6A:
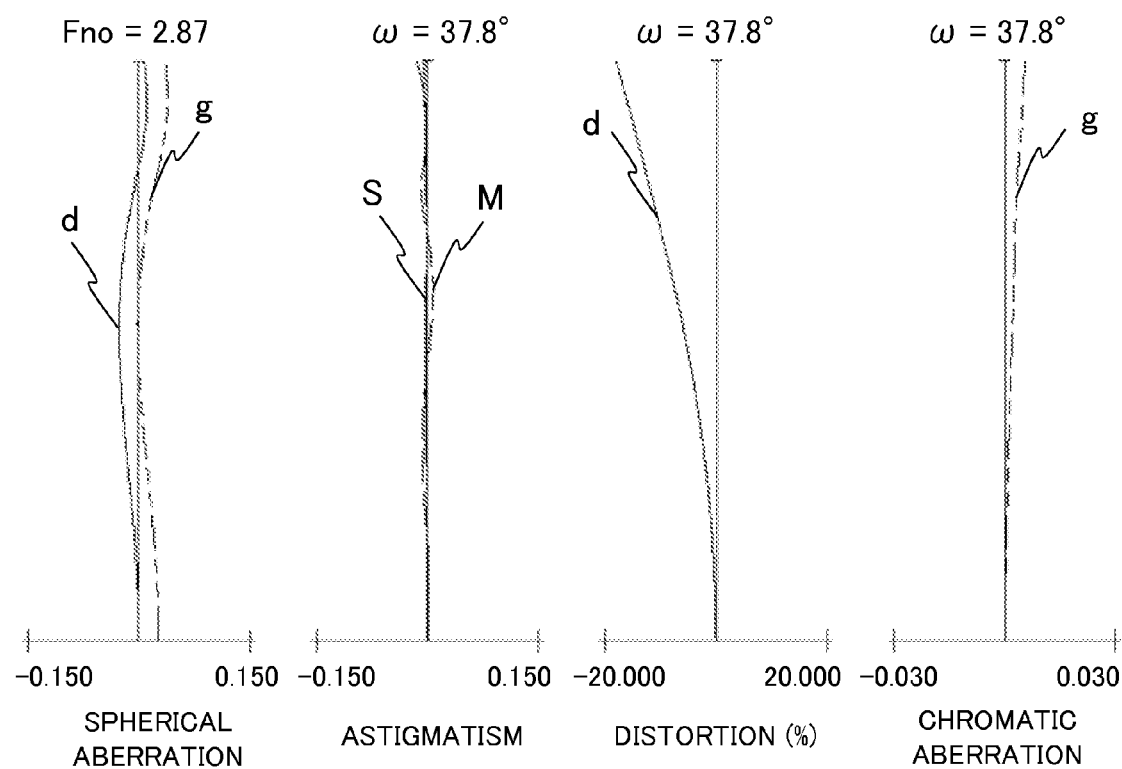
FIGS. 6A to 6C are aberration diagrams of the zoom lens at a wide-angle end, at an intermediate zoom position, and at a telephoto end, respectively, in Embodiment 3 of the present invention.
Figure 6B:
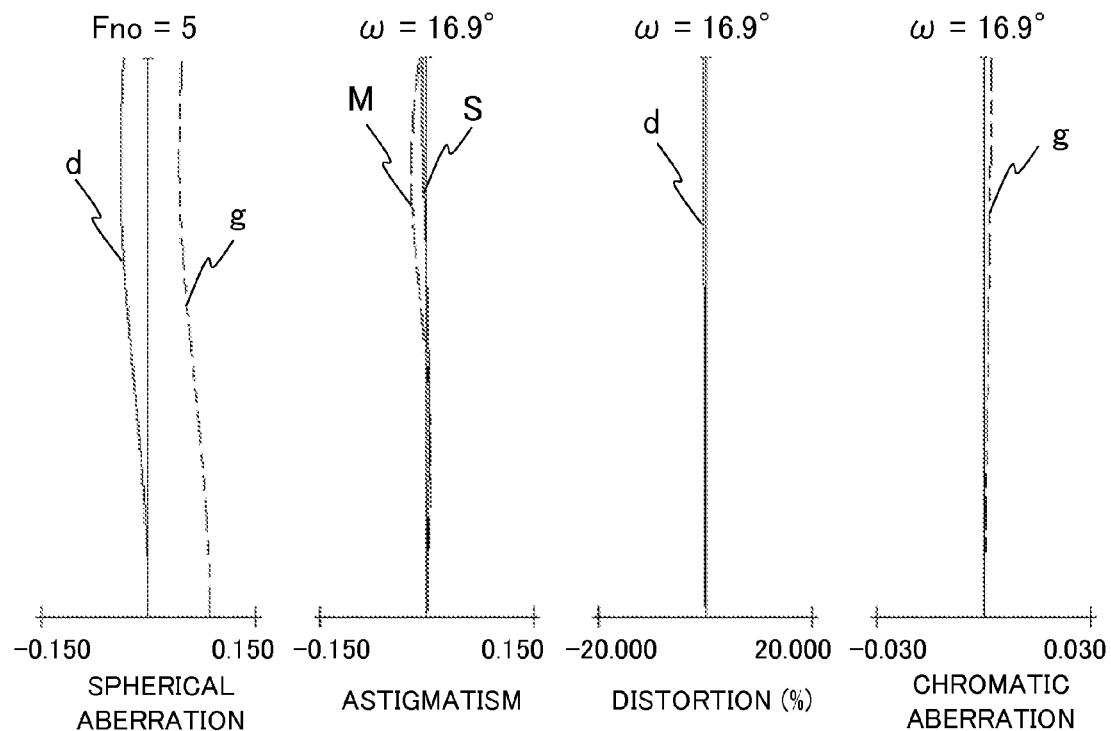
Figure 6C:
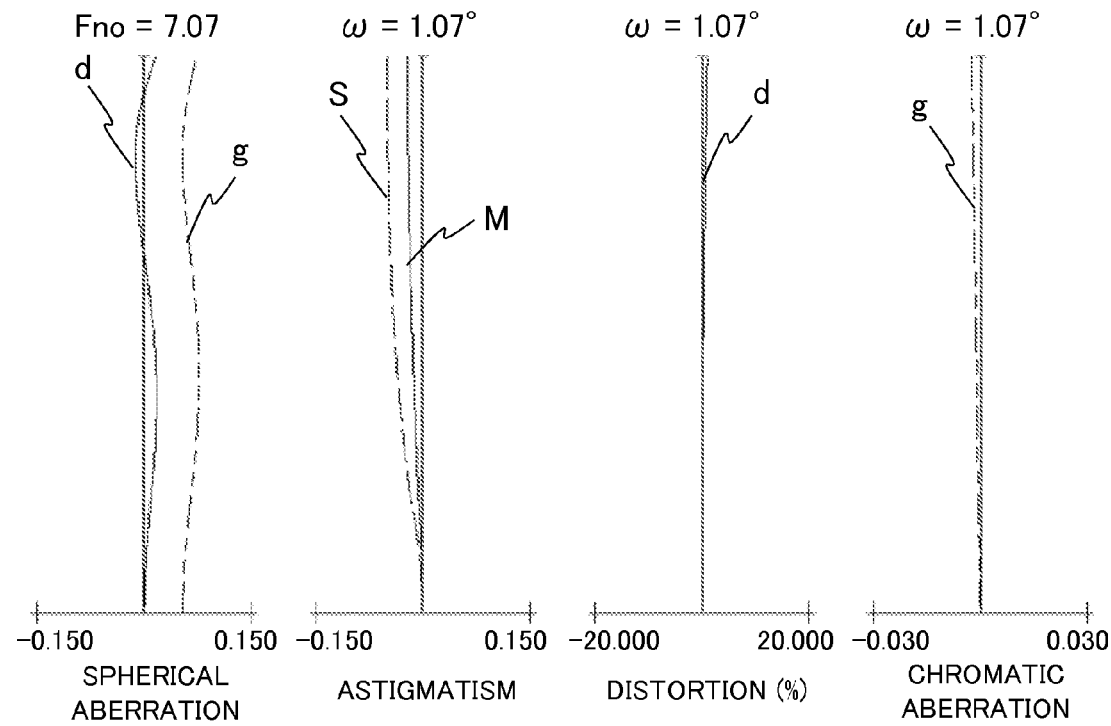

FIG. 5 is a diagram of lenses of a zoom lens at the wide-angle end in Embodiment 3 of the present invention. FIGS. 6A to 6C are aberration diagrams of the zoom lens at the wide-angle end, at the intermediate zoom position, and at the telephoto end, respectively, in Embodiment 3. Embodiment 3 describes the zoom lens that has a zoom ratio of around 48.4 and an aperture ratio of around 2.87 to 7.07.

Figure 7:
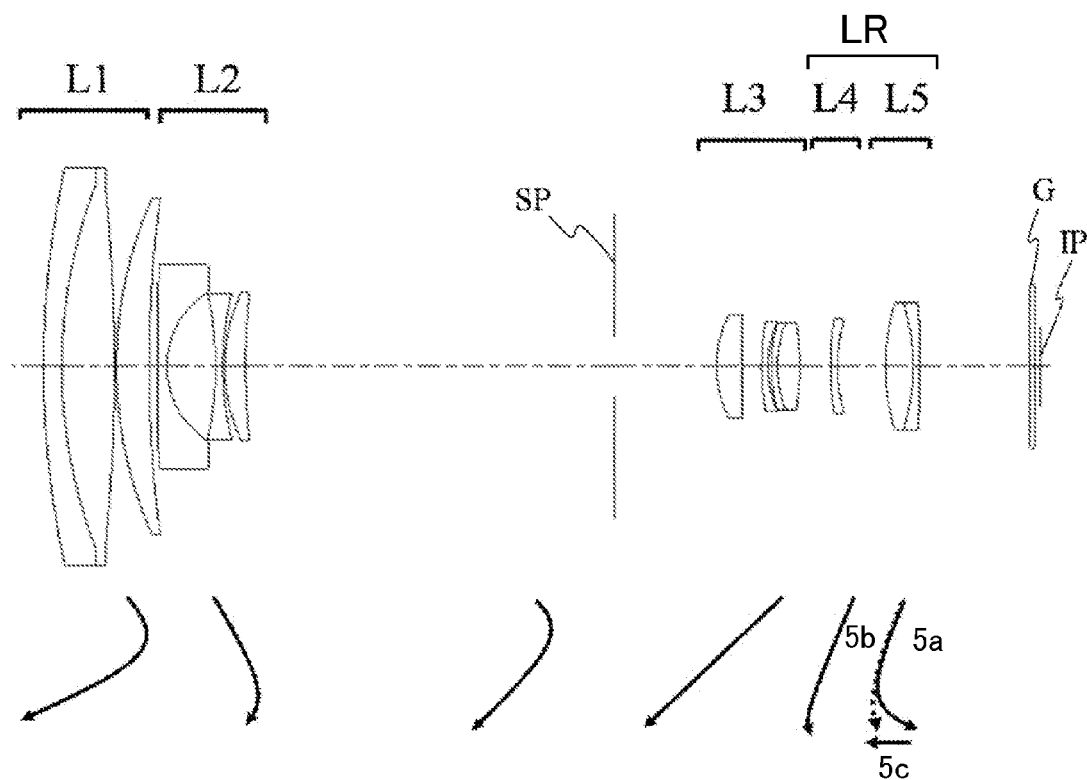
FIG. 7 is a cross-sectional diagram of lenses of a zoom lens in Embodiment 4 of the present invention.
Figure 8A:
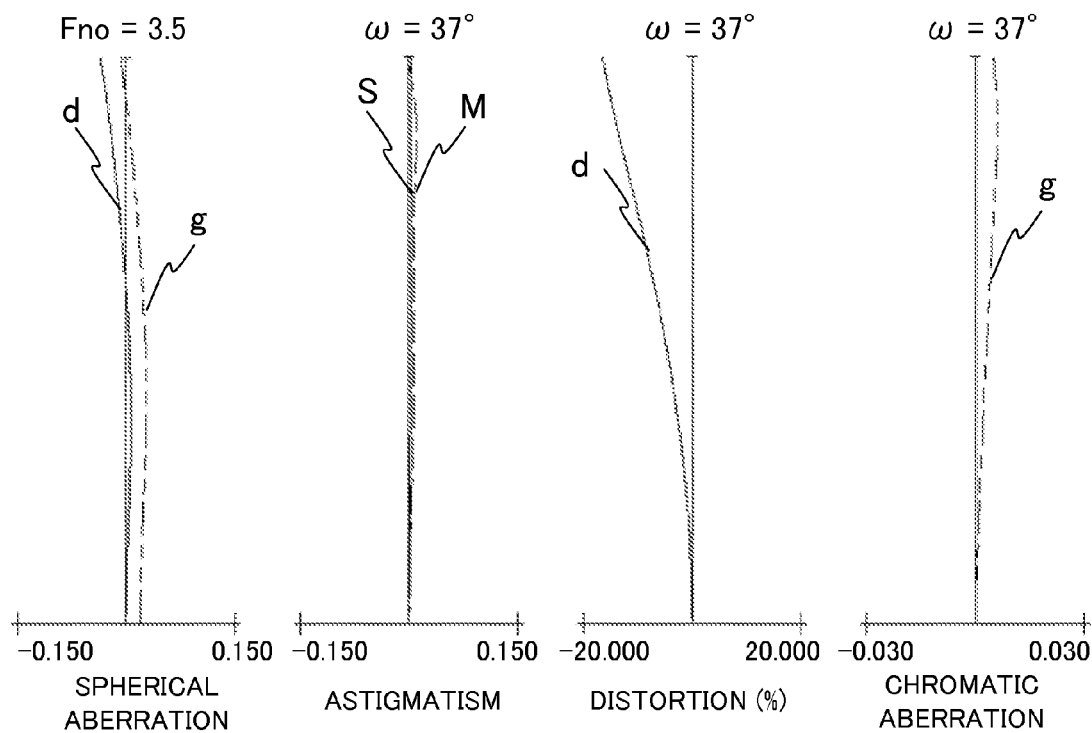
FIGS. 8A to 8C are aberration diagrams of the zoom lens at a wide-angle end, at an intermediate zoom position, and at a telephoto end, respectively, in Embodiment 4 of the present invention.
Figure 8B:
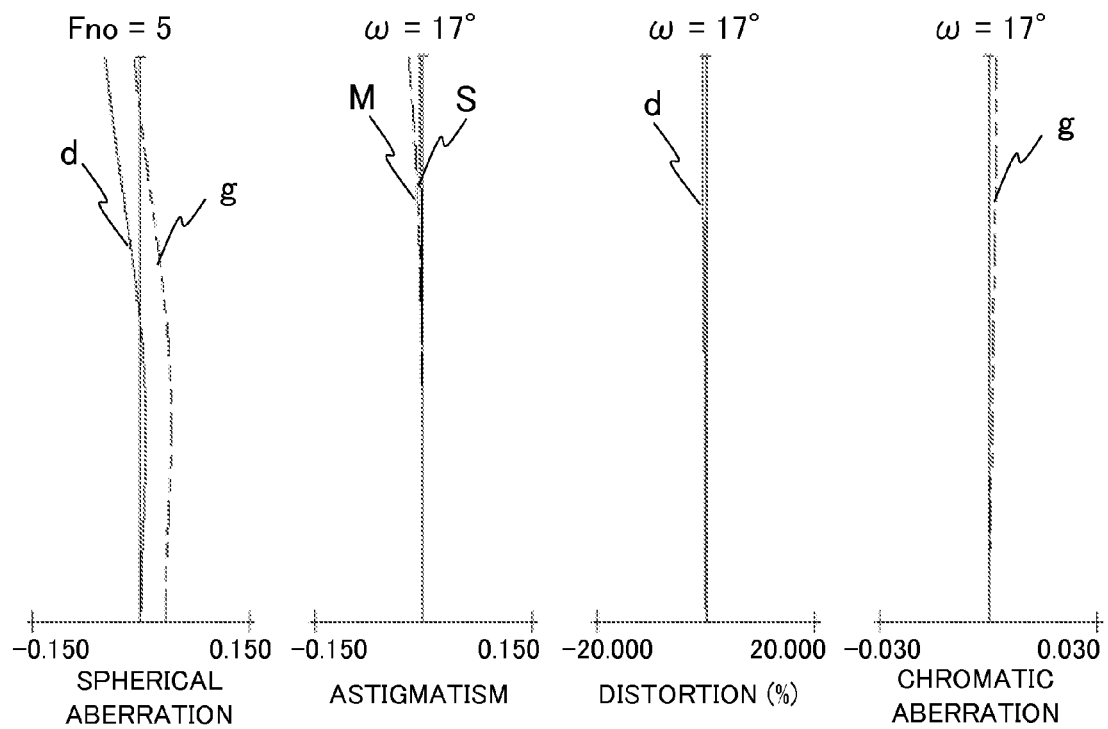
Figure 8C:
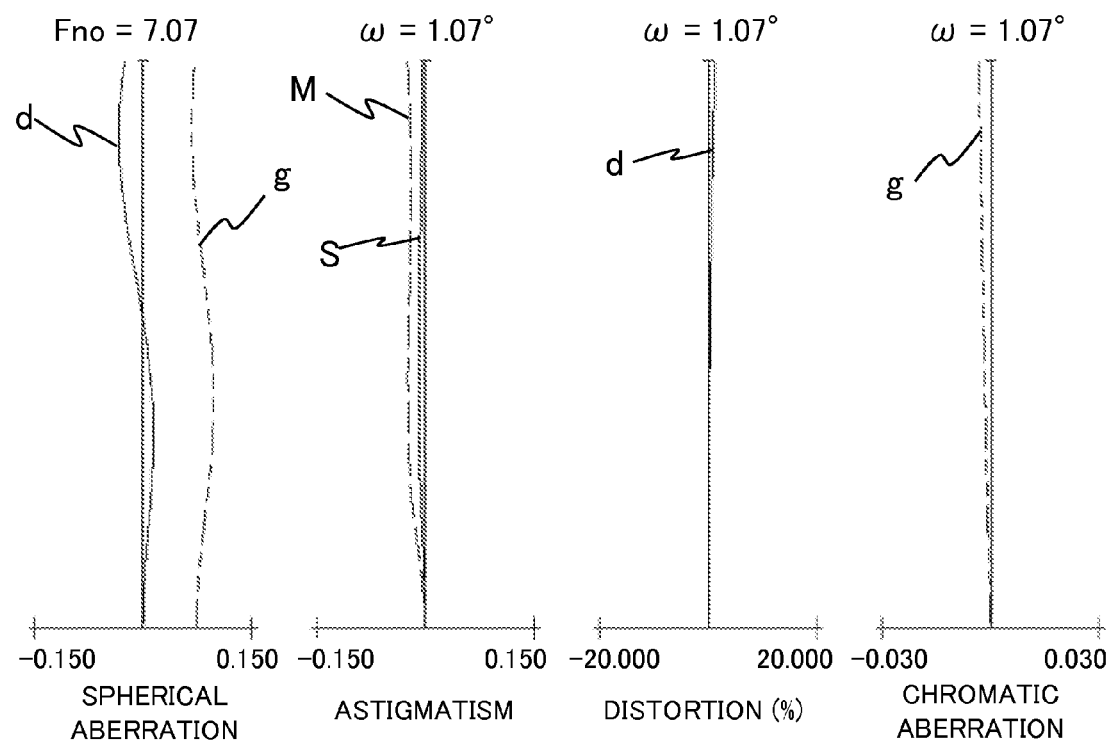

FIG. 7 is a diagram of lenses of a zoom lens at the wide-angle end in Embodiment 4 of the present invention. FIGS. 8A to 8C are aberration diagrams of the zoom lens at the wide-angle end, at the intermediate zoom position, and at the telephoto end, respectively, in Embodiment 4. Embodiment 4 describes the zoom lens that has a zoom ratio of around 47.1 and an aperture ratio of around 3.50 to 7.07.

Figure 9:
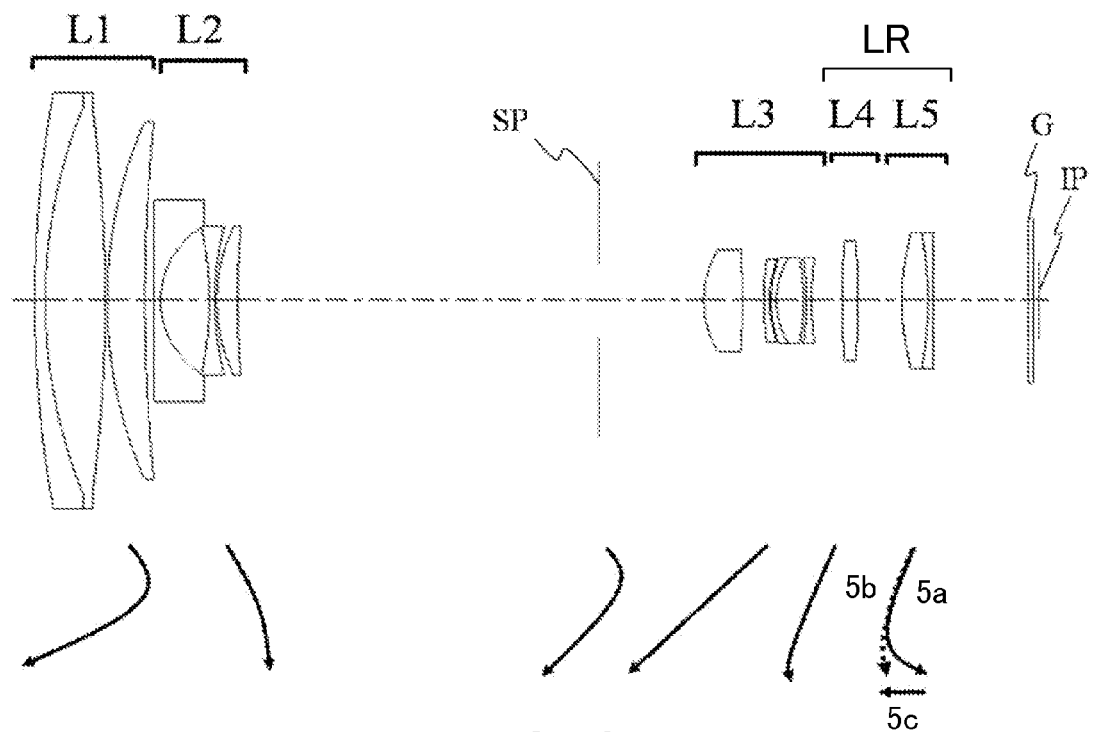
FIG. 9 is a cross-sectional diagram of lenses of a zoom lens in Embodiment 5 of the present invention.
Figure 10A:
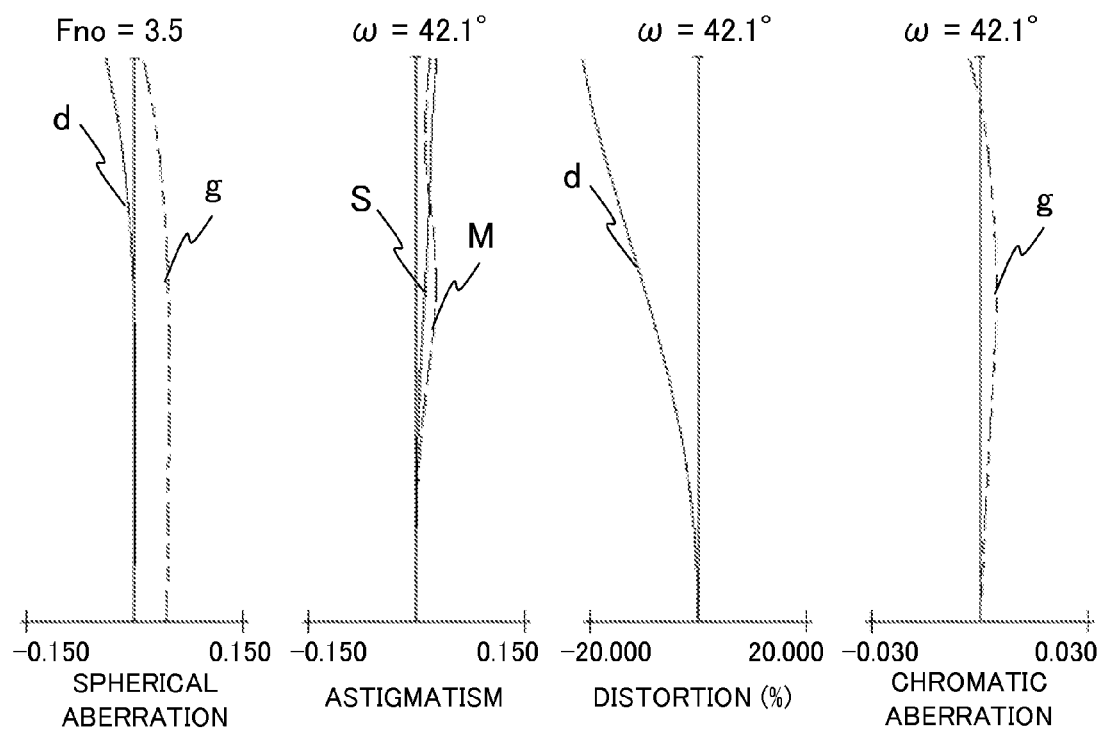
FIGS. 10A to 10C are aberration diagrams of the zoom lens at a wide-angle end, at an intermediate zoom position, and at a telephoto end, respectively, in Embodiment 5 of the present invention.
Figure 10B:
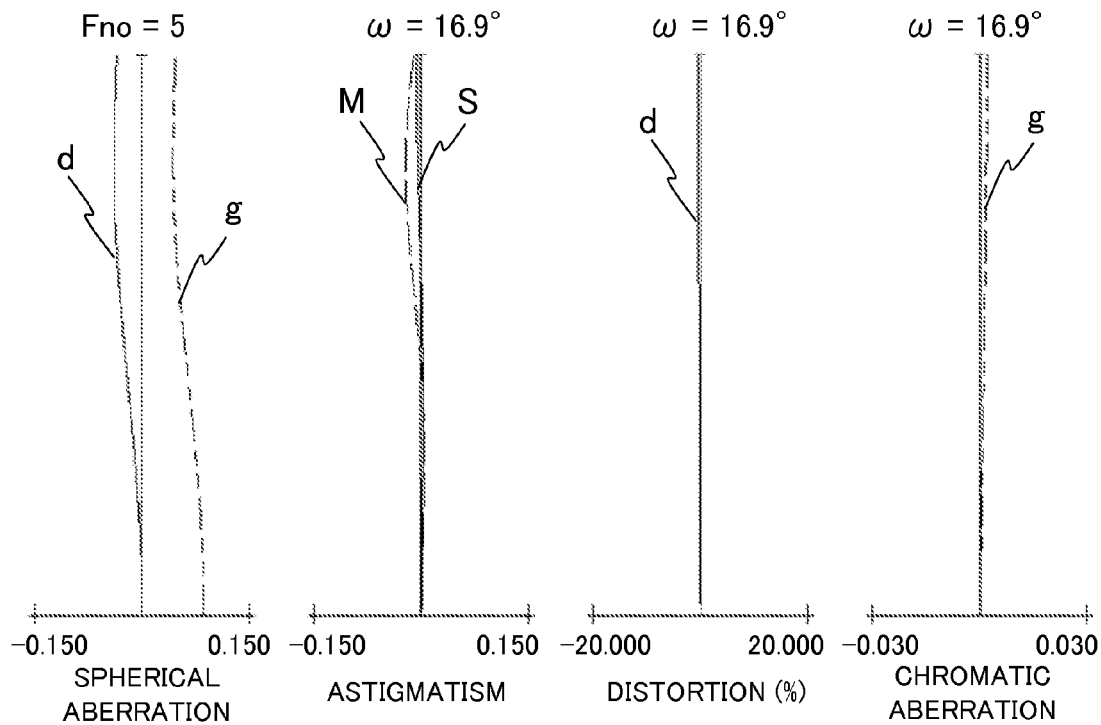
Figure 10C:
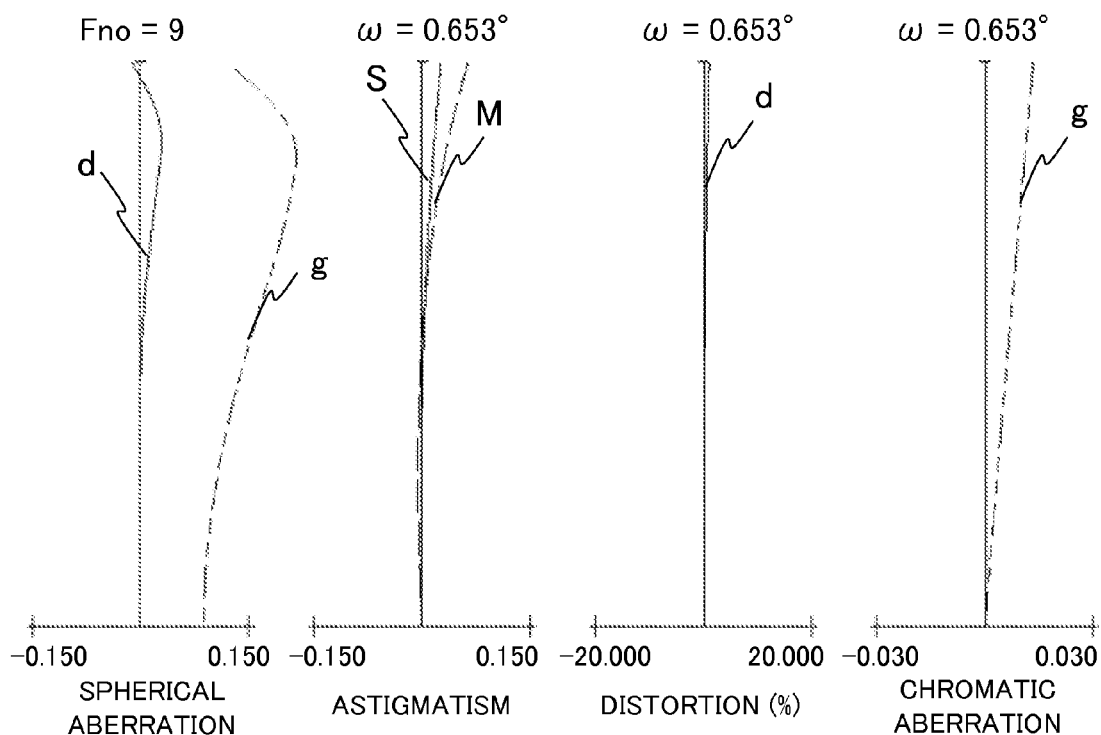
Figure 11:
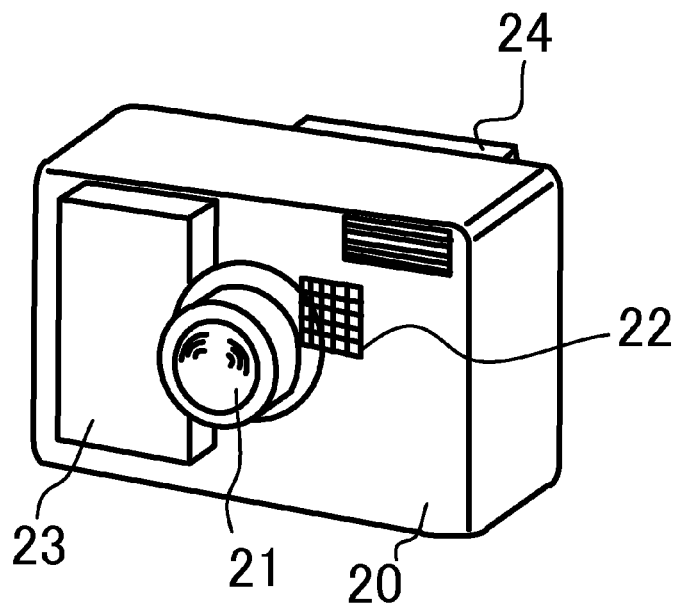
FIG. 11 is a schematic diagram of a main part of an image pickup apparatus in the present embodiment.
Figure 12:
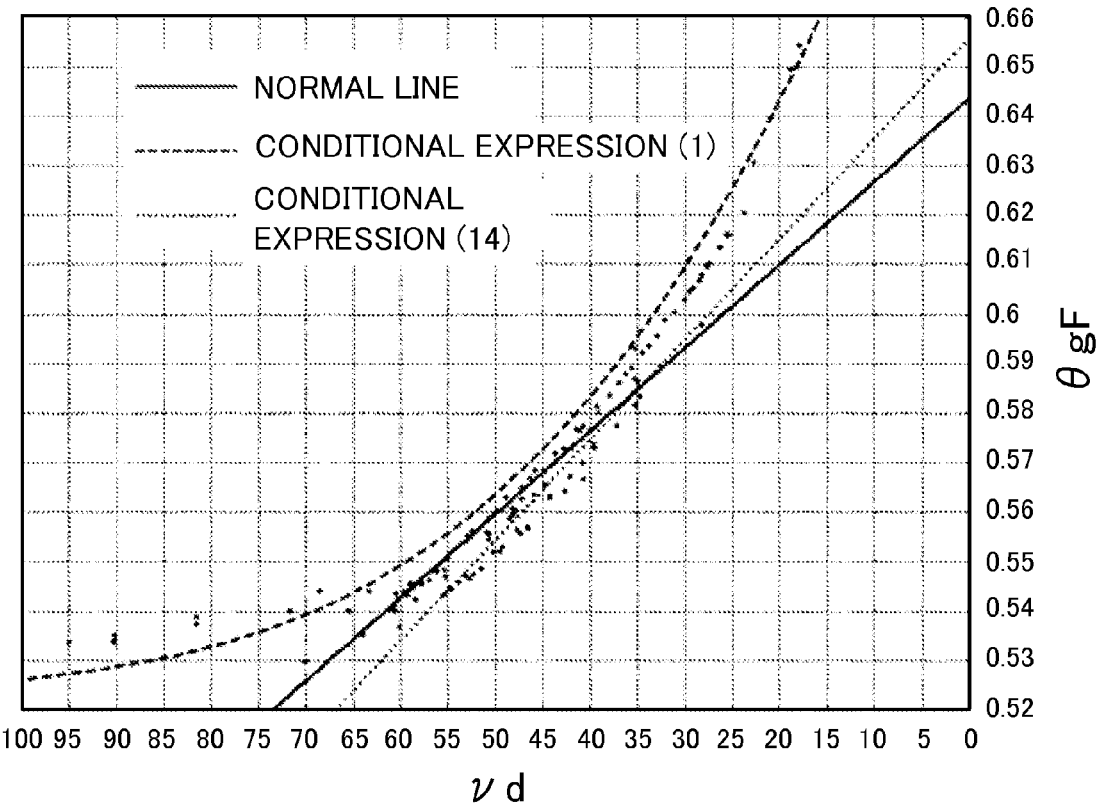
FIG. 12 is a diagram of describing a relation between θgF and vd.

FIG. 9 is a diagram of lenses of a zoom lens at the wide-angle end in Embodiment 5 of the present invention. FIGS. 10A to 10C are aberration diagrams of the zoom lens at the wide-angle end, at the intermediate zoom position, and at the telephoto end, respectively, in Embodiment 5. Embodiment 5 describes the zoom lens that has a zoom ratio of around 94.4 and an aperture ratio of around 3.50 to 9.00. FIG. 11 is a schematic diagram of a main part of a digital still camera (an image pickup apparatus) that includes the zoom lens of the present invention. FIG. 12 is a diagram of describing a relation between θgF and vd.

The zoom lens of each embodiment is an image pickup lens system that is used for an image pickup apparatus such as a video camera, a digital still camera, a silver-salt film camera, or a TV camera. The zoom lens of each embodiment can also be used as a projection optical system for a projection apparatus (a projector). In each of the cross-sectional diagrams of the lenses, a left side indicates the object side (a front side) and a right side indicates the image side (a rear side). In each of the cross-sectional diagrams of the lenses, when symbol i denotes an order of the lens unit from the object side, symbol Li denotes an i-th lens unit. Symbol LR denotes a rear lens group including one or more lens units.

Symbol SP denotes an aperture stop, and symbol G denotes an optical block that corresponds to an optical filter, a face plate, a low-pass filter, an infrared cut filter, or the like. Symbol IP denotes an image plane. The image plane IP corresponds to an imaging plane of a solid-state image pickup element (a photoelectric conversion element) such as a CCD sensor or a CMOS sensor when the zoom lens is used as an image pickup optical system of the video camera or the digital still camera. The image plane IP corresponds to a film surface when the zoom lens is used as an image pickup optical system of the silver-salt film camera.

An arrow indicates a moving locus of each lens unit and a moving direction of the lens unit in focusing when zooming (varying a magnification) is performed from the wide-angle end to the telephoto end. In each of the spherical aberration diagrams, symbol d denotes a d-line (a wavelength of 587.6 nm), and symbol g denotes a g-line (a wavelength of 435.8 nm). In each of astigmatism diagrams, symbols S and M denotes a sagittal image plane and a meridional image plane, respectively. Each of distortions is indicated for the d-line. In each of diagrams of a chromatic aberration of magnification, symbol g denotes the g-line. In each of embodiments described below, each of the wide-angle end and the telephoto end is a zoom position at which a magnification-varying lens unit is mechanically located at both ends of a movable range on an optical axis.

Each embodiment relates to a zoom lens configured by, in order from the object side to the image side, including a first lens unit L1 having a positive refractive power, a second lens unit L2 having a negative refractive power, a third lens unit L3 having a positive refractive power, and a rear lens group LR having one or more lens units and having a positive refractive power as a whole. A distance between adjacent lens units changes in zooming.

In each embodiment, all the lens units move in zooming. The rear lens group LR is configured by a fourth lens unit L4 having a negative refractive power and a fifth lens unit L5 having a positive refractive power in Embodiments 1, 4, and 5. In Embodiment 2, the rear lens group LR is configured by a fourth lens unit L4 having a positive refractive power. In Embodiment 3, the rear lens group LR is configured by a fourth lens unit L4 having a positive refractive power and a fifth lens unit L5 having a positive refractive power.

Next, a lens configuration of the zoom lens in each embodiment will be described. The zoom lens of each of Embodiments 1, 4, and 5 includes, in order from the object side to the image side, the first lens unit L1 having the positive refractive power, the second lens unit L2 having the negative refractive power, and an aperture stop SP. The zoom lens is configured by further including the third lens unit L3 having the positive refractive power, the fourth lens unit L4 having the negative refractive power, and the fifth lens unit L5 having the positive refractive power, and thus the zoom lens is configured by a total of five lens units.

In zooming from the wide-angle end to the telephoto end, the first lens unit L1 moves to the image side, and then it moves to the object side. In other words, the first lens unit L1 moves along a locus convex towards the image side. The first lens unit L1 at the telephoto end is located closer to the object side than the first lens unit L1 at the wide-angle end. The second lens unit L2 moves to the image side, the third lens unit L3 moves to the object side, and the fourth lens unit L4 moves to the object side. The fifth lens unit L5 moves along a locus convex towards the object side. The aperture stop SP monotonously moves to the object side along a locus different from a locus of each lens unit or moves along a locus convex towards the image side. The aperture stop SP moves so that the aperture stop SP at the telephoto end is located closer to the object side than the aperture stop SP at the wide-angle end.

The zoom lens in each of Embodiments 1, 4, and 5 performs a main magnification-varying operation by movements of the first lens unit L1, the second lens unit L2, and the third lens unit L3. In zooming, the first lens unit L1 is moved so that the first lens unit L1 at the telephoto end is located closer to the object side than the first lens unit L1 at the wide-angle end, and thus a total lens length (a length from the first lens surface to the image plane) at the wide-angle end is reduced and also a large zoom ratio can be obtained.

In zooming, the second lens unit L2 is moved so that the second lens unit L2 at the telephoto end is located closer to the image side than the second lens unit L2 at the wide-angle end, and thus the second lens unit L2 has a large magnification variation effect. In zooming, the third lens unit L3 is moved so that the third lens unit L3 at the telephoto end is located closer to the object side than the third lens unit L3 at the wide-angle end, and thus the third lens unit L3 has a large magnification variation effect. In zooming, the fourth lens unit L4 is moved so that the fourth lens unit L4 at the telephoto end is located closer to the object side than the fourth lens unit L4 at the wide-angle end, and thus a focus space to move the fifth lens unit L5 that is a focus lens unit is sufficiently ensured.

In each of Embodiments, 1, 4, and 5, a rear focus method of moving the fifth lens unit L5 in an optical axis direction in focusing is adopted. In zooming from the wide-angle end to the telephoto end, the aperture stop SP is moved to the object side along a locus different from a locus of each lens unit, and thus an effective diameter of a front lens is reduced. In addition, the aperture stop SP is moved so that the aperture stop SP at the telephoto end is located closer to the object side than the aperture stop SP at the wide-angle end, and thus the effective diameter of the front lens is reduced in obtaining a wide angle of field.

The fifth lens unit L5 is moved so as to correct an image plane variation caused by a magnification variation and also to perform a focusing. In zooming, the fifth lens unit L5 is moved along a locus convex towards the object side, and thus a space between the fourth lens unit L4 and the fifth lens unit L5 is effectively used, and the reduction in the total lens length is effectively achieved. A curved solid line 5a and a curved dotted line 5b with respect to the fifth lens unit L5 are moving loci to correct the image plane variation caused by the magnification variation in focusing on an object at infinity and an object at a short distance, respectively.

When the zoom lens at the telephoto end performs a focusing from the object at infinity to the object at the short distance, the fifth lens unit L5 that is a lens unit closest to the image side is moved forward as indicated by an arrow 5C.

A zoom lens of Embodiment 2 is, in order from the object side to the image side, configured by the first lens unit L1 having the positive refractive power, the second lens unit L2 having the negative refractive power, and the aperture stop SP, the third lens unit L3 having the positive refractive power, and the fourth lens unit L4 having the positive refractive power, and thus the zoom lens includes four lens units. In zooming from the wide-angle end to the telephoto end, the first lens unit L1 moves along a locus convex towards the image side. The first lens unit L1 at the telephoto end is located closer to the object side than the first lens unit L1 at the wide-angle end. The second lens unit L2 moves to the image side, and the third lens unit L3 moves to the object side, and the fourth lens unit L4 moves along a locus convex towards the object side. The aperture stop SP moves along a locus convex towards the image side, which is different from a locus of each lens unit.

The zoom lens of the present embodiment performs the magnification variation by the movements of the first lens unit L1, the second lens unit L2, and the third lens unit L3. In zooming, the first lens unit L1 is moved so that the first lens unit L1 at the telephoto end is located closer to the object side than the first lens unit L1 at the wide-angle end, and thus the total lens length at the wide-angle end is reduced and also a large zoom ratio can be obtained. In zooming, the second lens unit L2 is moved so that the second lens unit L2 at the telephoto end is located closer to the image side than the second lens unit L2 at the wide-angle end, and thus the second lens unit L2 has a large magnification variation effect.

In zooming, the third lens unit L3 is moved so that the third lens unit L3 at the telephoto end is located closer to the object side than the third lens unit L3 at the wide-angle end, and thus the third lens unit L3 has a large magnification variation effect.

In Embodiment 2, a rear focus method of moving the fourth lens unit L4 in the optical axis direction in focusing is adopted. In zooming, the aperture stop SP is moved along a locus different from a locus of each of other lens units, and thus the effective diameter of the front lens is reduced. In addition, the aperture stop SP is moved so that the aperture stop SP at the telephoto end is located closer to the object side than the aperture stop SP at the wide-angle end, and thus the effective diameter of the front lens is reduced in obtaining a wide angle of field. The fourth lens unit L4 is moved so as to correct the image plane variation caused by the magnification variation and also to perform the focusing.

A curved solid line 4a and a curved dotted line 4b with respect to the fourth lens unit L4 are moving loci to correct the image plane variation caused by the magnification variation in focusing on the object at infinity and the object at the short distance, respectively. When the zoom lens at the telephoto end performs a focusing from the object at infinity to the object at the short distance, the fourth lens unit L4 is moved forward as indicated by an arrow 4C.

The zoom lens of Embodiment 3 is, in order from the object side to the image side, configured by the first lens unit L1 having the positive refractive power, the second lens unit L2 having the negative refractive power, and the aperture stop SP. The zoom lens further includes the third lens unit L3 having the positive refractive power, the fourth lens unit L4 having the positive refractive power, and the fifth lens unit L5 having the positive refractive power, and thus it is configured by a total of five lens units.

In zooming from the wide-angle end to the telephoto end, the first lens unit L1 moves along a locus convex towards the image side. The first lens unit L1 at the telephoto end is located closer to the object side than the first lens unit L1 at the wide-angle end. The second lens unit L2 moves to the image side, and the third lens unit L3 moves to the object side, and the fourth lens L4 unit moves to the object side. The fifth lens unit L5 moves along a locus convex towards the object side. The aperture stop SP moves along a locus convex towards the image side, which is different from a locus of each lens unit. The zoom lens in Embodiment 3 performs a main magnification-varying operation by the movements of the first lens unit L1, the second lens unit L2, and the third lens unit L3.

In zooming, the first lens unit L1 is moved so that the first lens unit L1 at the telephoto end is located closer to the object side than the first lens unit L1 at the wide-angle end, and thus the total lens length at the wide-angle end is reduced and also a large zoom ratio can be obtained.

In zooming, the second lens unit L2 is moved so that the second lens unit L2 at the telephoto end is located closer to the image side than the second lens unit L2 at the wide-angle end, and thus the second lens unit L2 has a large magnification variation effect. In zooming, the third lens unit L3 is moved so that the third lens unit L3 at the telephoto end is located closer to the object side than the third lens unit L3 at the wide-angle end, and thus the third lens unit L3 has a large magnification variation effect. In zooming, the fourth lens unit L4 is moved so that the fourth lens unit L4 at the telephoto end is located closer to the object side than the fourth lens unit L4 at the wide-angle end, and thus a focus space to move the fifth lens unit L5 that is a focus lens unit is sufficiently ensured.

In Embodiment 3, a rear focus method of moving the fifth lens unit L5 in the optical axis direction in focusing is adopted. In zooming from the wide-angle end to the telephoto end, the aperture stop SP is moved to the object side along a locus different from a locus of each lens unit, and thus an effective diameter of a front lens is reduced. In addition, the aperture stop SP is moved so that the aperture stop SP at the telephoto end is located closer to the object side than the aperture stop SP at the wide-angle end, and thus the effective diameter of the front lens is reduced in obtaining a wide angle of field. The fifth lens unit L5 is moved so as to correct the image plane variation caused by the magnification variation and also to perform the focusing.

In zooming, the fifth lens unit L5 is moved along a locus convex towards the object side, and thus a space between the fourth lens unit L4 and the fifth lens unit L5 is effectively used, and the reduction in the total lens length is effectively achieved. The curved solid line 5a and the curved dotted line 5b with respect to the fifth lens unit L5 are moving loci to correct the image plane variation caused by the magnification variation in focusing on an object at infinity and an object at a short distance, respectively. When the zoom lens at the telephoto end performs a focusing from the object at infinity to the object at the short distance, the fifth lens unit L5 is moved forward as indicated by an arrow 5C.

As described above, in each embodiment, the focusing from the object at infinity to the object at the short distance is performed by moving the lens unit which is located closest to the image side to the object side.

Commonly, in order to reduce the size of the zoom lens, the number of lenses only needs to be reduced while the refractive power of each lens unit is strengthened. However, in the zoom lens having this configuration, a thickness of the lens (a thickness in the optical axis direction) is increased, the effect of shortening a lens system is insufficient, and amounts of generating various kinds of aberrations are increased, and therefore it is difficult to obtain a high optical performance. Therefore, in order to obtain a higher zoom ratio and reduce a total of the lens system, it is important to appropriately set a zoom type, the refractive power of each lens unit, a configuration of the lenses constituting each lens unit, and the like.

It is important to appropriately select a material that is used as the lens so that various kinds of aberrations including a chromatic aberration is reduced at each zoom position, considering a refractive index and Abbe's number. For example, in order to reduce the size of a total system using a positive-lead type zoom lens and also to obtain a high zoom ratio, it is important to have a configuration where a total of the first lens unit that has the largest diameter (an effective diameter) of diameters of the lenses.

In order to reduce the size of a total of the first lens unit, it is effective to reduce the number of the lenses constituting the first lens unit. In order to reduce the amount of generating the chromatic aberration in the first lens unit, it is important to select the appropriate material as the lenses constituting the first lens unit considering the refractive index, the Abbe's number, and the like.

FIG. 12 is a graph that has a vertical axis indicating a partial dispersion ratio θgF so as to increase in an upward direction and a lateral axis indicating the Abbe's number so as to increase in a leftward direction for a common optical glass (hereinafter, referred to as a "diagram of θgF-vd"). When the material is mapped on the diagram of θgF-vd, it is known that a distribution along a straight line called a normal line is obtained.

In the embodiment, when the refractive indices of the material for the g-line (a wavelength of 435.8 nm), the F-line (486.1 nm), the C-line (656.3 nm), and the d-line (587.6 nm) are denoted by Ng, NF, NC, and Nd, respectively, the Abbe's number vd and the partial dispersion ratio θgF are represented as follows.

$$vd=(Nd-1)/(NF-NC)$$

$$\theta gF=(Ng-NF)/(NF-NC)$$

Commonly, in the positive-lead zoom lens including a long focal length range, an on-axis ray passes through the highest position of the first lens unit, and therefore a secondary spectrum of an axial chromatic aberration or a spherical aberration in accordance with a color is easily generated. Since the axial chromatic aberration may be increased when a correction of the spherical aberration in accordance with the color is balanced, it is preferred that the secondary spectrum of the axial chromatic aberration is as small as possible. In this first lens unit, in order to reduce the secondary spectrum of the axial chromatic aberration, an inclination of a straight line connecting glass materials of a positive lens and a negative lens that constitute the first lens unit needs to be gentle in the diagram of θgF-vd.

For example, it is preferred that a glass material such as a fluorite that has a large Abbe's number vd and that is in a region distant from the normal line in a direction where the partial dispersion ratio θgF increases in the diagram of θgF-vd is used as a positive lens in the first lens unit. In addition, as a glass material of a lanthanum system, it is preferred that a glass material that is in a region distant from the normal line in a direction where the partial dispersion ratio θgF decreases in the diagram of θgF-vd is used as a negative lens in the first lens unit. According to this combination, the inclination of the straight line connecting the glass materials of the positive lens and the negative lens in the first lens unit is significantly gentler than that of the normal line, and an effect of correcting the secondary spectrum of the axial chromatic aberration is obtained.

Thus, optimizing the glass material that is used for the first lens unit, the secondary spectrum of the axial chromatic aberration can be reduced in a predetermined focal length range.

However, in an image pickup lens that has a zoom magnification of over 40 times (a zoom ratio of 40) and that has a long focal length of over 1000 mm which is a focal length at the telephoto end as a converted focal length of the image pickup lens using a silver-salt film, the secondary spectrum of the axial chromatic aberration is increased. In order to suppress this secondary spectrum, it is also necessary for the lens units other than the first lens unit to use a glass material having an anomalous dispersion such as a fluorite.

As described above, the secondary spectrum of the spherical aberration in accordance with the color or the axial chromatic aberration is easily generated when the on-axis ray passes through a high position. When the zoom lens includes the first lens unit having the positive refractive power, the second lens unit having the negative refractive power, and the third lens unit having the positive refractive power, the on-axis ray passes a high position in the third lens unit next to the first lens unit. If the glass material that is in the region distant from the normal line in the diagram of θgF-vd is used for the material of the positive lens of the third lens unit, it is easy to further reduce the secondary spectrum of the axial chromatic aberration.

On the other hand, when the wide angle of field that is less than or equal to 28 mm as a converted focal length by the image pickup lens using the silver-salt film at the wide-angle end is achieved, a chromatic aberration of magnification is deteriorated. When a glass material having an anomalous dispersion is used in order to reduce the axial chromatic aberration at the telephoto end, the chromatic aberration of magnification may be deteriorated at the wide-angle end.

Thus, it is difficult to obtain a high optical performance over an entire zoom range when the glass material having the anomalous dispersion is only used for the zoom lens. In order to obtain a high zoom ratio and reduce a total lens system using the glass material in the region distant from the normal line, it is necessary to appropriately set the zoom type and the refractive power of each lens unit. In particular, it is necessary to appropriately set the refractive power of the lenses in each lens unit, the lens configuration, the moving locus of each lens unit in zooming, and the like.

Commonly, in the positive-lead zoom lens, a diameter of a surface of the first lens unit closest to the object side is determined by an off-axis ray at the wide-angle end in many cases, and the effective diameter of the front lens increases as the angle of field is widened. Therefore, it is preferred that the total lens length is reduced at the wide-angle end, the aperture stop and the lens unit are separated, and further the aperture stop comes close to the first lens unit. In zooming, the magnification at the telephoto end is increased by moving the first lens unit to the object side, and thus the effective diameter of the first lens unit can be reduced.

If the number of the lenses constituting the first lens unit is limited and distortion is permitted to some extent using an appropriate material so as to electronically correct the distortion, the effective diameter is easily reduced while the number of the lenses of the first lens unit is small, and thus the reduction in size of the total system can be achieved.

Next, a feature common to each embodiment will be described. In each embodiment, the first lens unit L1 moves to the object side at the telephoto end, compared to that at the wide-angle end. The third lens unit L3 includes at least one positive lens. A partial dispersion ratio of a material of one positive lens of the third lens unit L3 is defined as θgF3P, Abbe's number of the positive lens is defined as vd3P, and focal lengths of the total system at the wide-angle end and the telephoto end are defined as fW and fT, respectively. A focal length of the first lens unit L1 is defined as f1, and a focal length of the third lens unit L3 is defined as f3.

In this case, the following conditional expressions are satisfied.

$$\theta gF3P - (-1.665 \times 10^{-7} \cdot vd3P^3 + 5.213 \times 10^{-5} \cdot vd3P^2 - 5.656 \times 10^{-3} \cdot vd3P + 0.737) > 0 \quad (1)$$

$$50.0 < vd3P < 100.0 \quad (2)$$

$$8.0 < fT/f3 < 20.0 \quad (3)$$

$$15.0 < f1/fW < 30.0 \quad (4)$$

In the expressions, the Abbe's number vd3P and the partial dispersion ratio θgF3P of the material are as described above.

Next, a technical meaning of each conditional expression mentioned above will be described.

Conditional Expression (1) defines the partial dispersion ratio θgF3P of the material of the positive lens in the third lens unit L3. When a value at a left-hand side in Conditional Expression (1) is smaller than or equal to 0, the secondary spectrum of the axial chromatic aberration is increased at the telephoto end.

Conditional Expression (2) defines the Abbe's number vd3P of the material of the positive lens in the third lens unit L3. When a value exceeds the upper limit value of Conditional Expression (2) as a result of increasing the Abbe's number vd3P, a difference from the Abbe's number of the material of the negative lens in the third lens unit L3 is increased. As a result, for example when a cemented lens is included in the third lens unit L3, a surface of the cemented lens can be gentle and thus it is advantageous to the reduction in size of the total system, however, an existing glass material is reduced. On the other hand, when the value exceeds the lower limit value of Conditional Expression (2) as a result of decreasing the Abbe's number vd3P, a curvature of the surface of the cemented lens is heavy (steep), and therefore it is not preferable since the thickness of the lens is increased and the size of the total system is increased.

Conditional Expression (3) defines a ratio of the focal length of the total system and the focal length of the third lens unit L3 at the telephoto end. When a value exceeds the upper limit value of Conditional Expression (3) and thus the refractive power (an inverse of the focal length) of the third lens unit L3 is strengthened, a moving amount of the third lens unit L3 in zooming is reduced. In this case, the reduction in size of the lens system is easily performed but the spherical aberration, the comma aberration, and the axial chromatic aberration at the telephoto end are increased and therefore it is difficult to correct these various kinds of aberrations. On the other hand, when the value exceeds the lower limit value of Conditional Expression (3) and the refractive power of the third lens unit L3 is weakened, it is easy to correct the spherical aberration, the comma aberration, and the axial chromatic aberration, but the moving amount of the third lens unit L3 in zooming is increased and therefore the size of the total system is increased.

Conditional Expression (4) defines a ratio of the focal length of the total system and the focal length of the first lens unit L1 at the wide-angle end. When a value exceeds the lower limit value of Conditional Expression (4) and thus the refractive power of the first lens unit L1 is too strong, the chromatic aberration of magnification is increased at the wide-angle end, and the axial chromatic aberration is increased at the telephoto end. In addition, the axial chromatic aberration is increased at the wide-angle end since the refractive power of the first lens unit L1 is strengthened, and as a result, it is difficult to correct the chromatic aberration even when the anomalous dispersion is used as the material of the lens in the third lens unit L3. The number of the lenses in the first lens unit L1 can be increased in order to correct the spherical aberration, but the number of the lenses is increased and therefore the size of the effective diameter of the first lens unit L1 is increased since the number of the lenses in order to widen the angle of field. On the other hand, when the value exceeds the upper limit value of Conditional Expression (4) and thus the refractive power of the first lens unit L1 is too weak, it is easy to correct the chromatic aberration of magnification at the wide-angle end and the axial chromatic aberration and the spherical aberration at the telephoto end. However, since the refractive power is too weak, the moving amount of the first lens unit L1 is increased in zooming from the wide-angle end to the telephoto end, and therefore the size of the total system is increased.

According to the configuration described above, various kinds of aberrations are appropriately corrected and especially the generation of the secondary spectrum of the axial chromatic aberration caused by achieving the high zoom ratio is reduced, and therefore a zoom lens with a high wide-angle of field and a high zoom ratio, having a high optical performance over an entire zoom range, can be obtained. In each embodiment, it is further preferred that at least one of the following conditional expressions is satisfied. In the following conditional expressions, symbol MS is a moving amount of the aperture stop SP in zooming from the wide-angle end to the telephoto end. Symbols f1 and f2 are focal lengths of the first lens unit L1 and the second lens unit L2, respectively.

The third lens unit L3 includes a positive lens as a lens located closest to the object side, and symbol f3A is a focal length of the positive lens. Symbols M1 and M3 are moving amounts of the first lens unit L1 and the third lens unit L3 in zooming from the wide-angle end to the telephoto end. The first lens unit L1 is configured by three lenses including a positive lens, and symbols θgF1P and vd1P are a partial dispersion ratio and Abbe's number of a material of at least one positive lens in the first lens unit L1, respectively. The first lens unit L1 includes at least one negative lens, and symbols θgF1N and vd1N are a partial dispersion ratio and Abbe's number of a material of at least one negative lens in the first lens unit L1, respectively.

The first lens unit L1 includes at least one negative lens, and symbol nd is a refractive index of the material of at least one negative lens in the first lens unit L1. Symbol D2 is a distance from a lens surface closest to the image side of the second lens unit L2 to the aperture stop SP at the wide-angle end, and symbol D3 is a distance from the aperture stop SP to a lens surface closest to the object side of the third lens unit L3 at the wide-angle end. In this case, it is preferred that at least one of the following conditional expressions is satisfied.

$$3.5 < f3/fW < 6.5 \quad (5)$$

$$10.0 < fT/f3A < 22.0 \quad (6)$$

$$-11.0 < M3/fW < -4.5 \quad (7)$$

$$-20.0 < M1/fW < -7.5 \quad (8)$$

$$\theta gF1P - (-1.665 \times 10^{-7} \cdot vd1P^3 + 5.213 \times 10^{-5} \cdot vd1P^2 - 5.656 \times 10^{-3} \cdot vd1P + 0.737) > 0 \quad (9)$$

$$50.0 < vd1P < 100.0 \quad (10)$$

$$30.0 < vd1N < 50.0 \quad (11)$$

$$0.52 < \theta gF1N \quad (12)$$

$$\theta gF1N < -0.00203 \times vd1N + 0.656 \quad (13)$$

$$1.75 < nd < 2.10 \quad (14)$$

$$-40.0 < fT/f2 < -20.0 \quad (15)$$

$$-20.0 < fT/MS < -11.0 \quad (16)$$

$$0.45 < MS/M3 < 0.70 \quad (17)$$

$$1.0 < D2/D3 < 5.0 \quad (18)$$

With respect to the sign of the moving amount of the lens unit or the aperture stop, as a result of the movement in zooming from the wide-angle end to the telephoto end, the sign is negative when the position of the lens unit or the aperture stop is located closer to the object side at the telephoto end compared to the position at the wide-angle end, and on the other hand the sign is positive when the position is located closer to the image side at the telephoto end compared to the position at the wide-angle end.

Next, a technical meaning of each conditional expression mentioned above will be described. Conditional Expression (5) defines a ratio of a focal length of the total system and a focal length of the third lens unit L3 at the wide-angle end. When a value exceeds the upper limit value of Conditional Expression (5) and thus the refractive power of the third lens unit L3 is too weak, the moving amount of the third lens unit L3 in zooming is increased. Therefore, the total lens length is increased and it is difficult to reduce the size of the total system. On the other hand, when the value exceeds the lower limit value of Conditional Expression (5) and thus the refractive power of the third lens unit L3 is increased, it is easy to reduce the size of the total system since the moving amount of the third lens unit L3 in zooming is decreased. However, for the third lens unit L3, the spherical aberration, the coma aberration, the axial chromatic aberration, and the like are increased, and it is difficult to correct these aberrations. It may also be difficult to reduce the focal length at the wide-angle end. It is necessary to increase the number of the lenses in order to correct the various aberrations, which is not preferable since the size of the total system is increased.

Conditional Expression (6) defines a ratio of a focal length of the total system and a focal length of a positive lens as a lens closest to the object side of the third lens unit L3 at the telephoto end. In the positive lens closest to the object side of the third lens unit L3, the on-axis ray passes through the highest position in the third lens unit L3, and therefore it influences on the corrections of the spherical aberration, the coma aberration, and the axial chromatic aberration. When a value exceeds the upper limit value of Conditional Expression (6) and thus the refractive power of the positive lens is strengthened, it is difficult to correct the various aberrations described above. On the other hand, when the value exceeds the lower limit value of Conditional Expression (6) and thus the refractive power of the positive lens is weakened, it is easy to correct the spherical aberration, the coma aberration, the axial chromatic aberration, and the like, however, the lens configuration length of the third lens unit L3 is increased and thus it is not preferable since the size of the total system is increased.

Conditional Expression (7) defines a ratio of the focal length of the total system at the wide-angle end and the moving amount of the third lens unit L3 in zooming. When a value exceeds the lower limit value of Conditional Expression (7) and thus the moving amount of the third lens unit L3 is increased, it is not preferable since the size of the total system of the lenses is increased. On the other hand, when the upper limit value of Conditional Expression (7) and thus the moving amount of the third lens unit L3 in zooming is decreased, the size of the total system of the lenses is reduced. However, the refractive power of the third lens unit L3 needs to be strengthened in order to ensure a predetermined zoom ratio, and because of this, the spherical aberration or the coma aberration is increased, and it is not preferable since the axial chromatic aberration is especially increased at the telephoto end. It is also difficult to reduce the focal length at the wide-angle end.

Conditional Expression (8) defines a ratio of the focal length of the total system at the wide-angle end and the moving amount of the first lens unit L1 in zooming. When a value exceeds the lower limit value of Conditional Expression (8) and thus the moving amount of the first lens unit L1 in zooming is increased, it is not preferable since the size of the total system of the lenses is increased. On the other hand, when the value exceeds the upper limit value of Conditional Expression (8) and thus the moving amount of the first lens unit L1 in zooming is reduced, the size of the total system of the lenses is reduced. However, the refractive power of the first lens unit L1 needs to be strengthened in order to ensure a predetermined zoom ratio, and as a result, it is not preferable since the chromatic aberration of magnification is increased at the wide-angle end and the spherical aberration or the coma aberration is increased at the telephoto end.

For the positive-lead zoom lens, the first lens unit L1 has a very important role to correct the aberration. The aberration generated in the first lens unit L1 is magnified by a square of a lateral magnification of the lens units between the first lens unit L1 and the image plane. Therefore, the aberration generated in the first lens unit L1 needs to be suppressed in the first lens unit L1 as much as possible. In order to suppress the axial chromatic aberration that is generated by achieving the high zoom ratio, it is preferred that the inclination of the straight line connecting the glass materials of the negative lens and the positive lens in the first lens unit L1 is gentle in the diagram of θgF-vd described above. According to this, it is easy to correct the secondary spectrum of the axial chromatic aberration.

Conditional Expressions (9) and (10) define the partial dispersion ratio θgF1P and the Abbe's number vd1P of the material of the positive lens in the first lens unit L1. When a value of the left-hand side of Conditional Expression (9) is less than or equal to 0, the straight line connecting the glass materials of the negative lens and the positive lens cannot be gentle in the diagram of θgF-vd and the secondary spectrum of the axial chromatic aberration is increased, and therefore it is difficult to obtain a high optical performance in achieving the high zoom ratio.

When a value exceeds the lower limit value of Conditional Expression (10) and thus the Abbe's number is decreased, in order to correct the chromatic aberration, a cemented lens surface of a cemented lens in the first lens unit L1 is heavy (steep). When the cemented lens surface is heavy, an edge area of the lens is reduced, and therefore considering a process condition, a thickness of the lens needs to be increased. When the thickness of the lens is increased, an effective diameter of the front lens is increased as the angle of field is widened, and therefore it is difficult to reduce the size of the total system. When the value exceeds the upper limit value of Conditional Expression (10) and thus the Abbe's number is increased, it is easy to reduce the size of the total system since the cemented lens surface is gentle, but there are fewer options for the material.

Conditional Expressions (11), (12), and (13) define the Abbe's number vd1N and the partial dispersion ratio θgF1N of the material of the negative lens in the first lens unit L1. When a value exceeds the upper limit value of Conditional Expression (11) and thus the Abbe's number is increased, in order to correct the chromatic aberration, the cemented lens surface of the cemented lens in the first lens unit L1 is heavy. When the cemented lens surface is heavy, the edge area of the lens is reduced, and therefore considering the process condition, the thickness of the lens needs to be increased. When the thickness of the lens is increased, the effective diameter of the front lens is increased as the angle of field is widened, and therefore it is difficult to reduce the size of the total system.

On the other hand, when the value exceeds the lower limit value of Conditional Expression (11) and thus the Abbe's number is decreased, it is easy to reduce the size of the total system since the cemented lens surface is gentle, but it is not preferable since kinds of glasses which exist at the lower side relative to the normal line in the diagram of θgF-vd is decreased. In addition, in the diagram of θgF-vd, materials which exist in a region where a value exceeds the lower limit value of Conditional Expression (12) and the partial dispersion ratio θgF1N is small are decreased.

When a value exceeds the upper limit value of Conditional Expression (13) and thus the partial dispersion ratio θgF1N is increased, the straight line connecting the glass materials of the negative lens and the positive lens in the diagram of θgF-vd cannot be gentled and the secondary spectrum of the axial chromatic aberration is increased, and therefore it is difficult to obtain the high optical performance in achieving the high zoom ratio.

Conditional Expression (14) defines the refractive index of the material of the negative lens in the first lens unit L1. When a value exceeds the upper limit value of Conditional Expression (14) and thus the refractive index is increased, the effective diameter of the first lens unit L1 is decreased since the refractive index is increased, but there are fewer options for the material. When the value exceeds the lower limit value of Conditional Expression (14) and thus the refractive index is decreased, the effective diameter of the first lens unit L1 is increased since the refractive index is decreased.

Conditional Expression (15) defines the focal length of the second lens unit L2. In each embodiment, the focal length of the second lens unit L2, as well as the first lens unit L1 and the third lens unit L3, are appropriately set, and thus a predetermined zoom ratio is ensured. When a value exceeds the lower limit value of Conditional Expression (15) and thus the refractive power of the second lens unit L2 is strengthened, the moving amount of the second lens unit L2 in zooming is decreased and it is easy to reduce the size of the total system, but the coma aberration is increased. On the other hand, when the value exceeds the upper limit value of Conditional Expression (15) and thus the refractive power of the second lens unit L2 is decreased, the moving amount in zooming is increased and the size of the total system is increased.

Conditional Expression (16) defines a ratio of the focal length of the total system at the telephoto end and the moving amount of the aperture stop SP in zooming. Moving the aperture stop SP in zooming, a degree of freedom can be provided to the moving amount of the second lens unit L2 or the third lens unit L3 in zooming. When the aperture stop SP is fixed, a mechanical structure is simple, however the moving amount of the second lens unit L2 or the first lens unit L1 in zooming is increased since the moving amount of the third lens unit L3 in zooming is defined.

When a value exceeds the upper limit value of Conditional Expression (16) and thus the moving amount of the aperture stop SP is decreased, the refractive power of the third lens unit L3 is strengthened since the moving amount of the third lens unit L3 in zooming is decreased. When the refractive power of the third lens unit L3 is strengthened, it is not preferable since the axial chromatic aberration, the spherical aberration, the coma aberration, and the like are increased. In order to correct the axial chromatic aberration, the spherical aberration, the coma aberration, and the like, the number of the lenses of the third lens unit L3 needs to be increased, and as a result, it is not preferable since the size of the third lens unit L3 is increased.

On the other hand, when the value exceeds the lower limit value of Conditional Expression (16) and thus the moving amount of the aperture stop SP is increased, the refractive power of the first lens unit L1 or the second lens unit L2 needs to be strengthened in order to obtain a predetermined zoom ratio since the refractive power of the third lens unit L3 is weakened. When the refractive power of the first lens unit L1 is strengthened, the axial chromatic aberration or the spherical aberration is increased. When the refractive power of the second lens unit L2 is strengthened, it is not preferable since the coma aberration is increased. In addition, since the number of lenses in any of the lens units needs to be increased, the size of the total system is increased.

Conditional Expression (17) defines a ratio of the moving amounts of the third lens unit L3 and the aperture stop SP in zooming. When a value exceeds the upper limit value of Conditional Expression (17) and thus the moving amount of the aperture stop SP is increased, the effective diameter of the first lens unit L1 is increased since a distance between the aperture stop SP and the first lens unit L1 is more distant at the wide-angle end. In order to reduce the size of the total system, the refractive power of the first lens unit L1 needs to be strengthened, however, it is not preferable since the spherical aberration or the axial chromatic aberration is increased.

On the other hand, when the value exceeds the lower limit value of Conditional Expression (17) and thus the moving amount of the aperture stop SP is decreased, the effective diameter of the third lens unit L3 is increased since the distance between the aperture stop SP and the third lens unit L3 is too small at the wide-angle end. When a condition of processing the lens such as an edge of each lens of the third lens unit L3 tries to be satisfied, the thickness of the lens is increased and the size of the lens is increased by the thickness, and therefore it is not preferable. For example, the moving amount of the third lens unit L3 is decreased by the thickness, and in order to ensure a predetermined zoom ratio, the refractive power of the third lens unit L3 needs to be strengthened.

When the refractive power of the third lens unit L3 is strengthened, it is not preferable since the spherical aberration, the coma aberration, and the axial chromatic aberration are increased.

Conditional Expression (18) defines, at the wide-angle end, a distance between the second lens unit L2 and the aperture stop SP and a distance between the third lens unit L3 and the aperture stop SP. When a value exceeds the upper limit value of Conditional Expression (18) and thus the distance is increased, the effective diameter of the first lens unit L1 can be decreased since a distance between the first lens unit L1 and the aperture stop SP at the wide-angle end is decreased. However, since the aperture stop SP comes close to the first lens unit L1, the aperture stop SP is distant from the third lens unit L3. In the third lens unit L3, an incident height of the off-axis ray is high and the effective diameter is large. As a result, it is not preferable since the size is increased.

On the other hand, when the value exceeds the lower limit value of Conditional Expression (18) and thus the distance is decreased, an incident height of the off-axis ray which passes through the first lens unit L1 is heightened and the effective diameter of the first lens unit L1 is increased since the distance between the third lens unit L3 and the aperture stop SP. Furthermore, the size of the first lens unit L1 is increased, which is not preferable. In each embodiment, it is preferred that numerical ranges of Conditional Expressions (2) to (8), (10) to (12), and (14) to (18) are set as follows.

$$60.0 < vd3P < 98.0 \quad (2a)$$

$$8.2 < fT/f3 < 19.5 \quad (3a)$$

$$15.3 < f1/fW < 28.5 \quad (4a)$$

$$3.7 < f3/fW < 6.2 \quad (5a)$$

$$10.3 < fT/f3A < 21.5 \quad (6a)$$

$$-10.5 < M3/fW < -4.9 \quad (7a)$$

$$-19.7 < M1/fW < -7.8 \quad (8a)$$

$$55.0 < vd1P < 98.0 \quad (10a)$$

$$33.0 < vd1N < 45.0 \quad (11a)$$

$$0.53 < \theta gF1N \quad (12a)$$

$$1.80 < nd < 2.00 \quad (14a)$$

$$-39.0 < fT/f2 < -21.0 \quad (15a)$$

$$-19.0 < fT/MS < -11.8 \quad (16a)$$

$$0.50 < MS/M3 < 0.66 \quad (17a)$$

$$1.3 < D2/D3 < 4.5 \quad (18a)$$

It is more preferred that numerical ranges of Conditional Expressions (2a) to (8a), (10a) to (12a), and (14a) to (18a) are set as follows so as to maximize the effect of each conditional expression described above.

$$70.0 < vd3P < 97.0 \quad (2b)$$

$$8.4 < fT/f3 < 19.0 \quad (3b)$$

$$15.5 < f1/fW < 27.8 \quad (4b)$$

$$3.8 < f3/fW < 5.8 \quad (5b)$$

$$10.5 < fT/f3A < 21.0 \quad (6b)$$

$$-10.3 < M3/fW < -5.2 \quad (7b)$$

$$-19.4 < M1/fW < -8.0 \quad (8b)$$

$$60.0 < vd1P < 96.0 \quad (10b)$$

$$35.0 < vd1N < 42.0 \quad (11b)$$

$$0.54 < \theta gF1N \quad (12b)$$

$$1.82 < nd < 1.95 \quad (14b)$$

$$-37.5 < fT/f2 < -21.3 \quad (15b)$$

$$-18.5 < fT/MS < -12.0 \quad (16b)$$

$$0.51 < MS/M3 < 0.64 \quad (17b)$$

$$1.5 < D2/D3 < 4.0 \quad (18b)$$

Next, a preferred configuration in each embodiment will be described. It is preferred that the first lens unit L1 is configured by three lenses including a negative lens and a positive lens.

When a zoom lens of a wide angle of field type is used, an outside diameter of the lens of the first lens unit L1 is determined by the off-axis ray, and therefore decreasing the number of the lenses of the first lens unit L1 is advantageous to reduce the size of the total system. In order to achieve the high zoom ratio, it is difficult to correct both the spherical aberration and the axial chromatic aberration with balance when the number of the lenses of the first lens unit L1 is small. Therefore, in order to achieve the wide angle of field and the high zoom ratio, it is preferred that the first lens unit L1 is configured by three lenses including the negative lens and the positive lens.

It is preferred that the first lens unit L1 is, in order from the object side to the image side, configured by three lenses of a negative lens, a positive lens, and a positive lens. It is preferred that the second lens unit L2 is, in order from the object side to the image side, configured by a negative lens, a negative lens, and a positive lens. Adopting this lens configuration for the second lens unit L2 that moves in zooming, it is easy to especially suppress a variation of the chromatic aberration of magnification caused by the zooming.

In each embodiment, the third lens unit L3 has a positive refractive power. At the wide-angle end, the on-axis light beam becomes a divergent light beam after passing through the second lens unit L2 that has a negative refractive power. Setting the third lens unit L3 that is located closest to the object side of the rear lens group behind the second lens unit L2 to have a positive refractive power, the light beam has a convergent function so as to reduce the effective diameter of the lenses in the rear lens group. It is preferred that the third lens unit L3 includes a cemented lens configured by, in order from the object side to the image side, a positive lens, a negative lens, and a cemented lens formed by cementing a negative lens and a positive lens.

This configuration is a so-called Tessar type that is configured by adding one lens to a triplet configuration, and it is easy to finely adjust the Petzval sum by adding one lens to the triplet configuration. Thus, it is easy to appropriately maintain a flatness of the image plane over an entire zoom range. Using an aspherical surface as a positive lens closest to the object side of the third lens unit L3 in which the on-axis ray is widely spread, it is easy to correct the spherical aberration, the coma aberration, and the like.

In each embodiment, an aspherical surface is introduced into the third lens unit L3, or into the second lens unit L2 if needed, and the refractive powers of especially the third lens unit L3 and the second lens unit L2 are appropriately set. According to this, the corrections of various kinds of the off-axis aberrations, particularly astigmatism and distortion, and the spherical aberration, the coma aberration, and the like that are generated when achieving the wide angle of field and the high zoom ratio can be effectively performed.

In zooming, it is easy to reduce the size of the total system since the aperture stop is moved independently of other lens units. In the positive-lead zoom lens, the effective diameter of the lens surface closest to the object side of the first lens unit is determined by the off-axis ray at the wide-angle end in many cases. Therefore, the effective diameter of the front lens is increased as the angle of field is widened, but on the other hand, the effective diameter of the first lens unit can be reduced as a position of the aperture stop comes close to the first lens unit.

Moving the aperture stop independently of the other lens units in zooming, the distance between the second lens unit and the third lens unit can be decreased at the telephoto end. Therefore, it is easy to ensure a long focal length without extremely extending the total lens length at the telephoto end.

In each embodiment, as described above, moving the aperture stop independently of the other lens units, the effective diameter of the first lens unit L1 is reduced at the wide-angle end and the high zoom ratio is achieved without increasing the total lens length at the telephoto end.

Moving the aperture stop independently of the other lens units means that the degree of freedom of the moving amount of the lens unit is increased, compared to a case where the aperture stop is fixed or for example a case where the aperture stop is moved integrally with the third lens unit.

Increasing the degree of freedom of the moving amount of the lens unit means that the degree of freedom of the refractive power for the optical performance or the specification of each lens unit is increased. As a result, it is easy to appropriately correct various aberrations such as a spherical aberration, a coma aberration, and an axial chromatic aberration, compared to a case where the aperture stop is fixed or the aperture stop is configured to be moved integrally with the third lens unit or the like.

As described above, according to each embodiment, a zoom lens that is suitably used for an image pickup apparatus using a solid-state image pickup element, has a zoom ratio of around 41.6 to 94.4 that is a high zoom ratio and an image pickup angle of field of 67 to 82 degrees at the wide-angle end that is a wide angle of field, and has a superior optical performance can be achieved.

Next, referring to FIG. 11, an embodiment of a digital camera (an image pickup apparatus) using the zoom lens of the present invention as an image pickup optical system will be described. In FIG. 11, reference numeral 20 denotes a digital camera body, and reference numeral 21 denotes an image pickup optical system that is configured by the zoom lens of the embodiment described above. Reference numeral 22 denotes an image pickup element (a photoelectric conversion element) such as a CCD that receives light of an object image by the image pickup optical system 21, and reference numeral 23 denotes a recording unit that records the object image received by the image pickup element 22. Reference numeral 24 denotes a finder that is used to observe the object image displayed on a display element (not shown).

The display element is configured by a liquid crystal panel or the like, and the object image formed on the image pickup element 22 is displayed on the display element. Thus, applying the zoom lens of the present invention to an image pickup apparatus such as a digital camera, a small-size image pickup apparatus with a high optical performance is achieved.

Hereinafter, specific numerical data of Numerical examples 1 to 5 that correspond to Embodiments 1 to 5, respectively, are indicated. In each numerical examples, symbol i denotes an order of a surface counted from the object side, and symbol ri denotes a radius of curvature of an i-th optical surface (i-th surface). Symbol di denotes an on-axis distance between the i-th surface and the (i+1)-th surface. Symbols ndi and vdi denote a refractive index and Abbe's number of the material of the i-th optical member for d-line, respectively. Each of two surfaces located closest to the image side corresponds to a glass block G. An aspherical shape is represented by the following expression, where an X axis is an optical axis direction, an H axis is a direction perpendicular to the optical axis, a traveling direction of light is positive, symbol R denotes a paraxial radius of curvature, symbol K denotes a conic constant, and symbols A4, A6, A8, A10, and A12 denote aspherical coefficients.

$$X = \frac{\frac{H^2}{R}}{1+\sqrt{1-(1+K)\left(\frac{H}{R}\right)^2}} + A4H^4 + A6H^6 + A8H^8 + A10H^{10} + A12H^{12}$$

Symbol "*" denotes a surface that has an aspherical shape. The description of "e-x" means "$\times 10^{-x}$". Symbol BF denotes a back focus, which indicates a distance from a final lens surface by air conversion. Table 1 indicates a relationship between each conditional expressions described above and each numerical example.

Numerical Example 1

Unit mm

Surface data

| Surface number | r | d | nd | υd | θgF |
|---|---|---|---|---|---|
| 1 | 91.764 | 1.80 | 1.91082 | 35.3 | 0.582 |
| 2 | 49.636 | 4.38 | 1.49700 | 81.5 | 0.538 |
| 3 | −171.988 | 0.18 | | | |
| 4 | 40.807 | 3.01 | 1.49700 | 81.5 | 0.538 |
| 5 | 126.402 | (variable) | | | |
| 6 | 157.210 | 0.95 | 1.88300 | 40.8 | |
| 7 | 8.768 | 4.76 | | | |
| 8 | −35.634 | 0.70 | 1.77250 | 49.6 | |
| 9 | 30.470 | 0.20 | | | |
| 10 | 17.427 | 1.78 | 1.95906 | 17.5 | |
| 11 | 65.831 | (variable) | | | |
| 12 (stop) | ∞ | (variable) | | | |
| 13* | 10.728 | 2.99 | 1.55332 | 71.7 | 0.540 |
| 14* | −2789.552 | 1.65 | | | |
| 15 | 24.031 | 0.60 | 1.77250 | 49.62 | |
| 16 | 11.205 | 0.36 | | | |
| 17 | 15.956 | 0.60 | 2.00100 | 29.1 | |
| 18 | 11.273 | 2.37 | 1.49700 | 81.5 | 0.538 |
| 19 | −28.103 | (variable) | | | |
| 20 | 31.461 | 0.70 | 1.70154 | 41.2 | |
| 21 | 16.418 | (variable) | | | |
| 22 | 23.373 | 2.76 | 1.80100 | 35.0 | |
| 23 | −20.628 | 0.60 | 1.84666 | 23.8 | |
| 24 | 402.226 | (variable) | | | |
| 25 | ∞ | 0.50 | 1.51633 | 64.1 | |
| 26 | ∞ | 0.50 | | | |
| Image plane | ∞ | | | | |

Aspherical surface data

Thirteenth surface

K = −8.61394e−001  A4 = 6.43510e−006  A6 = 4.28494e−007
A8 = −7.79572e−009  A10 = 2.62605e−010

Fourteenth surface

K = −3.11524e+006  A4 = 4.30164e−006  A6 = 5.58889e−007

Various kinds of data
Zoom ratio 41.60

Unit mm

| | Wide angle | Intermediate | Telephoto |
|---|---|---|---|
| Focal length | 5.00 | 12.64 | 208.00 |
| F-number | 3.50 | 5.00 | 7.07 |
| Half angle of field (degree) | 33.68 | 17.05 | 1.07 |
| Total lens length | 97.29 | 94.69 | 138.82 |
| BF | 11.72 | 19.65 | 11.73 |
| d 5 | 0.78 | 13.96 | 59.59 |
| d11 | 33.93 | 16.43 | 1.40 |
| d12 | 11.32 | 4.43 | 0.00 |
| d19 | 3.60 | 4.14 | 8.33 |
| d21 | 5.56 | 5.69 | 27.38 |
| d24 | 10.89 | 18.82 | 10.90 |

Zoom lens unit data

| Unit | Start surface | Focal length |
|---|---|---|
| 1 | 1 | 78.31 |
| 2 | 6 | −9.68 |
| 3 | 12 | ∞ |
| 4 | 13 | 19.63 |
| 5 | 20 | −49.90 |
| 6 | 22 | 33.11 |
| 7 | 25 | ∞ |

Numerical Example 2

Unit mm

Surface data

| Surface number | r | d | nd | υd | θgF |
|---|---|---|---|---|---|
| 1 | 118.898 | 1.00 | 1.83400 | 37.2 | 0.578 |
| 2 | 51.355 | 5.65 | 1.43875 | 94.9 | 0.534 |
| 3 | −146.583 | 0.18 | | | |
| 4 | 44.384 | 3.60 | 1.59282 | 68.6 | 0.544 |
| 5 | 180.112 | (variable) | | | |
| 6* | 330.723 | 0.70 | 1.88300 | 40.8 | |
| 7* | 8.391 | 4.69 | | | |
| 8 | −36.639 | 0.50 | 1.80400 | 46.6 | |
| 9 | 29.170 | 0.20 | | | |
| 10 | 16.884 | 2.00 | 1.94595 | 18.0 | |
| 11 | 84.719 | (variable) | | | |
| 12 (stop) | ∞ | (variable) | | | |
| 13* | 10.061 | 3.05 | 1.55332 | 71.7 | 0.540 |
| 14* | −71.895 | 2.21 | | | |
| 15 | 26.902 | 0.50 | 1.64769 | 33.8 | |
| 16 | 12.571 | 0.36 | | | |
| 17 | 21.417 | 0.50 | 1.80400 | 46.6 | |
| 18 | 8.405 | 2.50 | 1.45600 | 90.3 | |
| 19 | −25.249 | 0.30 | | | |
| 20 | −273.798 | 0.50 | 1.43875 | 94.9 | 0.529 |
| 21 | 46.826 | (variable) | | | |
| 22 | 24.630 | 2.50 | 1.74950 | 35.3 | |
| 23 | −27.309 | 0.50 | 1.94595 | 18.0 | |

-continued

Unit mm

| | | | | |
|---|---|---|---|---|
| 24 | −144.500 | (variable) | | |
| 25 | ∞ | 0.50 | 1.51633 | 64.1 |
| 26 | ∞ | 0.50 | | |
| Image plane | ∞ | | | |

Aspherical surface data

Sixth surface

K = −1.75187e+004   A4 = 1.82087e−005   A6 = 2.83972e−007
A8 = −7.97912e−009  A10 = 4.09945e−011  A12 = 2.21220e−014

Seventh surface

K = 1.20528e−001    A4 = −7.55082e−005  A6 = 1.39022e−006
A8 = −4.15841e−009  A10 = −7.59217e−010 A12 = −2.97367e−012

Thirteenth surface

K = −1.58517e−001   A4 = −2.35006e−005  A6 = −4.60642e−007
A8 = 3.31500e−009   A10 = 2.62605e−010

Fourteenth surface

K = 9.03683e+001    A4 = 1.28628e−004   A6 = 2.76898e−007

Various kinds of data
Zoom ratio 48.37

| | Wide angle | Intermediate | Telephoto |
|---|---|---|---|
| Focal length | 4.30 | 13.30 | 208.00 |
| F-number | 2.87 | 5.00 | 7.07 |
| Half angle of field (degree) | 37.77 | 16.25 | 1.07 |
| Total lens length | 94.75 | 94.56 | 138.99 |
| BF | 10.40 | 19.43 | 10.43 |
| d 5 | 0.78 | 17.70 | 63.20 |
| d11 | 34.26 | 13.22 | 0.90 |
| d12 | 10.24 | 3.39 | −0.50 |
| d21 | 7.62 | 9.38 | 33.52 |
| d24 | 9.57 | 18.60 | 9.60 |

Zoom lens unit data

| Unit | Start surface | Focal length |
|---|---|---|
| 1 | 1 | 79.99 |
| 2 | 6 | −9.25 |
| 3 | 12 | ∞ |
| 4 | 13 | 22.13 |
| 5 | 22 | 33.59 |
| 6 | 25 | ∞ |

Numerical Example 3

Unit mm

Surface data

| Surface number | r | d | nd | νd | θgF |
|---|---|---|---|---|---|
| 1 | 117.858 | 1.00 | 1.83400 | 37.2 | 0.578 |
| 2 | 51.351 | 5.70 | 1.43875 | 94.9 | 0.534 |
| 3 | −146.230 | 0.18 | | | |
| 4 | 44.371 | 3.60 | 1.59282 | 68.6 | 0.544 |
| 5 | 178.856 | (variable) | | | |
| 6* | 284.299 | 0.70 | 1.88300 | 40.8 | |
| 7* | 8.452 | 4.64 | | | |
| 8 | −34.894 | 0.50 | 1.80400 | 46.6 | |
| 9 | 28.442 | 0.20 | | | |
| 10 | 16.926 | 2.00 | 1.94595 | 18.0 | |

-continued

Unit mm

| | | | | | |
|---|---|---|---|---|---|
| 11 | 87.126 | (variable) | | | |
| 12 (stop) | ∞ | (variable) | | | |
| 13* | 10.061 | 3.65 | 1.55332 | 71.7 | 0.540 |
| 14* | −71.895 | 2.07 | | | |
| 15 | 33.298 | 0.50 | 1.64769 | 33.8 | |
| 16 | 10.865 | 0.18 | | | |
| 17 | 12.867 | 0.50 | 1.80400 | 46.6 | |
| 18 | 8.112 | 2.55 | 1.43875 | 94.9 | 0.527 |
| 19 | −26.710 | 0.30 | | | |
| 20 | −32.714 | 0.50 | 1.43875 | 94.9 | |
| 21 | 33.396 | (variable) | | | |
| 22 | 69.528 | 1.50 | 1.48749 | 70.2 | |
| 23 | −83.853 | (variable) | | | |
| 24 | 24.716 | 2.50 | 1.74950 | 35.3 | |
| 25 | −36.247 | 0.50 | 1.94595 | 18.0 | |
| 26 | −7074.464 | (variable) | | | |
| 27 | ∞ | 0.50 | 1.51633 | 64.1 | |
| 28 | ∞ | 0.50 | | | |
| Image plane | ∞ | | | | |

Aspherical surface data

Sixth surface

K = −1.66537e+004   A4 = 1.59155e−005   A6 = 3.94905e−007
A8 = −1.02328e−008  A10 = 4.49998e−011  A12 = 9.41671e−014

Seventh surface

K = 5.11487e−002    A4 = −8.45566e−005  A6 = 3.16949e−006
A8 = −3.44729e−008  A10 = −6.31977e−010 A12 = 1.78549e−012

Thirteenth surface

K = 1.42419e−002    A4 = −1.23913e−005  A6 = −2.77736e−007
A8 = 1.13051e−008   A10 = 2.62605e−010

Fourteenth surface

K = 9.76358e+001    A4 = 1.67979e−004   A6 = 1.19681e−006

Various kinds of data
Zoom ratio 48.37

| | Wide angle | Intermediate | Telephoto |
|---|---|---|---|
| Focal length | 4.30 | 12.77 | 208.00 |
| F-number | 2.87 | 5.00 | 7.07 |
| Half angle of field (degree) | 37.77 | 16.88 | 1.07 |
| Total lens length | 95.30 | 95.35 | 140.35 |
| BF | 9.83 | 18.45 | 9.07 |
| d 5 | 0.78 | 16.61 | 62.85 |
| d11 | 34.33 | 13.65 | 0.87 |
| d12 | 10.02 | 3.67 | −0.50 |
| d21 | 2.90 | 4.34 | 8.82 |
| d23 | 4.17 | 5.36 | 25.96 |
| d26 | 9.00 | 17.62 | 8.24 |

Zoom lens unit data

| Unit | Start surface | Focal length |
|---|---|---|
| 1 | 1 | 79.69 |
| 2 | 6 | −9.15 |
| 3 | 12 | ∞ |
| 4 | 13 | 24.29 |
| 5 | 22 | 78.22 |
| 6 | 24 | 39.58 |
| 7 | 27 | ∞ |

Numerical Example 4

Unit mm

Surface data

| Surface number | r | d | nd | νd | θgF |
|---|---|---|---|---|---|
| 1 | 91.809 | 1.80 | 1.91082 | 35.3 | 0.582 |
| 2 | 49.682 | 5.14 | 1.49700 | 81.5 | 0.538 |
| 3 | −172.691 | 0.18 | | | |
| 4 | 40.799 | 3.19 | 1.49700 | 81.5 | 0.538 |
| 5 | 125.399 | (variable) | | | |
| 6 | 264.824 | 0.95 | 1.88300 | 40.8 | |
| 7 | 8.654 | 4.75 | | | |
| 8 | −34.290 | 0.70 | 1.77250 | 49.6 | |
| 9 | 29.514 | 0.20 | | | |
| 10 | 17.261 | 2.03 | 1.95906 | 17.5 | |
| 11 | 68.338 | (variable) | | | |
| 12 (stop) | ∞ | (variable) | | | |
| 13* | 10.682 | 2.55 | 1.55332 | 71.7 | 0.540 |
| 14* | −1301.722 | 1.88 | | | |
| 15 | 25.419 | 0.60 | 1.77250 | 49.6 | |
| 16 | 11.168 | 0.32 | | | |
| 17 | 15.838 | 0.60 | 2.00330 | 28.3 | |
| 18 | 11.699 | 2.19 | 1.49700 | 81.5 | 0.538 |
| 19 | −26.225 | (variable) | | | |
| 20 | 27.270 | 0.70 | 1.91082 | 35.3 | |
| 21 | 16.857 | (variable) | | | |
| 22 | 22.140 | 2.70 | 1.77250 | 49.6 | |
| 23 | −20.954 | 0.60 | 1.91082 | 35.3 | |
| 24 | −323.774 | (variable) | | | |
| 25 | ∞ | 0.50 | 1.51633 | 64.1 | |
| 26 | ∞ | 0.50 | | | |
| Image plane | ∞ | | | | |

Aspherical surface data

Thirteenth surface

K = −1.00530e+000   A4 = 1.06429e−005   A6 = 3.26152e−007
A8 = 9.58317e−009   A10 = 2.62605e−010

Fourteenth surface

K = −5.46043e+005   A4 = −1.36233e−005   A6 = 1.09625e−006

Various kinds of data

Zoom ratio 47.06

| | Wide angle | Intermediate | Telephoto |
|---|---|---|---|
| Focal length | 4.42 | 12.67 | 208.00 |
| F-number | 3.50 | 5.00 | 7.07 |
| Half angle of field (degree) | 37.01 | 17.00 | 1.07 |
| Total lens length | 97.10 | 94.01 | 138.81 |
| BF | 11.63 | 19.04 | 11.10 |
| d 5 | 0.78 | 14.02 | 60.14 |
| d11 | 35.95 | 17.16 | 1.31 |
| d12 | 9.99 | 1.81 | 0.09 |
| d19 | 2.98 | 4.99 | 8.58 |
| d21 | 4.69 | 5.91 | 26.52 |
| d24 | 10.80 | 18.21 | 10.27 |

Zoom lens unit data

| Unit | Start surface | Focal length |
|---|---|---|
| 1 | 1 | 78.55 |
| 2 | 6 | −9.25 |
| 3 | 12 | ∞ |
| 4 | 13 | 19.11 |
| 5 | 20 | −50.07 |
| 6 | 22 | 31.97 |
| 7 | 25 | ∞ |

Numerical Example 5

Unit mm

Surface data

| Surface number | r | d | nd | νd | θgF |
|---|---|---|---|---|---|
| 1 | 110.420 | 0.50 | 1.88300 | 40.8 | 0.567 |
| 2 | 49.370 | 6.95 | 1.59282 | 68.6 | 0.544 |
| 3 | −1197.279 | 0.18 | | | |
| 4 | 46.135 | 4.25 | 1.43875 | 94.9 | 0.534 |
| 5 | 219.343 | (variable) | | | |
| 6* | 3857.846 | 0.50 | 1.88300 | 40.8 | |
| 7* | 8.384 | 5.38 | | | |
| 8 | −37.530 | 0.50 | 1.77250 | 49.6 | |
| 9 | 26.886 | 0.20 | | | |
| 10 | 18.126 | 2.00 | 2.00178 | 19.3 | |
| 11 | 104.140 | (variable) | | | |
| 12(stop) | ∞ | (variable) | | | |
| 13* | 10.094 | 3.00 | 1.55332 | 71.7 | 0.540 |
| 14* | −75.681 | 1.46 | | | |
| 15 | 26.802 | 0.50 | 1.64769 | 33.8 | |
| 16 | 10.724 | 0.37 | | | |
| 17 | 13.612 | 0.50 | 1.74320 | 49.3 | |
| 18 | 7.503 | 3.45 | 1.45600 | 90.3 | 0.534 |
| 19* | −36.264 | (variable) | | | |
| 20 | 51.283 | 0.50 | 1.51633 | 64.1 | |
| 21 | 16.483 | (variable) | | | |

-continued

| | | Unit mm | | | |
|---|---|---|---|---|---|
| 22 | 24.725 | 2.40 | 1.78590 | 44.2 | |
| 23 | −29.675 | 0.50 | 1.92286 | 18.9 | |
| 24 | −86.407 | (variable) | | | |
| 25 | ∞ | 0.50 | 1.51633 | 64.1 | |
| 26 | ∞ | 0.50 | | | |
| Image plane | ∞ | | | | |

Aspherical surface data

Sixth surface

K = 9.27342e+004    A4 = 3.81002e−005    A6 = −3.08623e−007
A8 = 9.42749e−010

Seventh surface

K = −1.01331e−001    A4 = 2.19036e−005    A6 = 1.40543e−006
A8 = −2.72919e−008

Thirteenth surface

K = −8.51411e−002    A4 = −1.17522e−004    A6 = −1.30376e−007
A8 = −2.15967e−008    A10 = 2.62605e−010

Fourteenth surface

K = −3.49998e+001    A4 = −2.57554e−005    A6 = −4.66479e−007

Nineteenth surface

K = −1.12299e+000    A4 = 1.68053e−006    A6 = 6.56435e−007
A8 = 1.63883e−009

Various kinds of data

Zoom ratio    94.44

| | Wide angle | Intermediate | Telephoto |
|---|---|---|---|
| Focal length | 3.60 | 14.51 | 340.00 |
| F-number | 3.50 | 5.00 | 9.00 |
| Half angle of field (degree) | 42.12 | 14.95 | 0.65 |
| Total lens length | 95.91 | 97.40 | 165.41 |
| BF | 10.48 | 21.86 | 2.28 |
| d 5 | 0.50 | 20.50 | 79.15 |
| d11 | 29.12 | 9.42 | 1.17 |
| d12 | 17.55 | 2.60 | 0.00 |
| d19 | 2.28 | 2.57 | 11.94 |
| d21 | 2.85 | 7.32 | 37.74 |
| d24 | 9.65 | 21.03 | 1.45 |

Zoom lens unit data

| Unit | Start surface | Focal length |
|---|---|---|
| 1 | 1 | 98.89 |
| 2 | 6 | −9.14 |
| 3 | 12 | ∞ |
| 4 | 13 | 18.17 |
| 5 | 20 | −47.27 |
| 6 | 22 | 26.66 |
| 7 | 25 | ∞ |

TABLE 1

| | | | CONDITIONAL EXPRESSION | | MORE PREFERRED | | FURTHER MORE PREFERRED | |
|---|---|---|---|---|---|---|---|---|
| | | | LOWER LIMIT VALUE | UPPER LIMIT VALUE | LOWER LIMIT VALUE | UPPER LIMIT VALUE | LOWER LIMIT VALUE | UPPER LIMIT VALUE |
| CONDITIONAL EXPRESSION | (1) (2) | θgF3P vd3P VALUE OF EXPRESSION | 50.0 | 100.0 | 60.0 | 90.0 | 70.0 | 75.0 |

TABLE 1-continued

| | | | | | | | |
|---|---|---|---|---|---|---|---|
| (1) | θgF3P | | | | | | |
| (2) | νd3P | 50.0 | 100.0 | 60.0 | 98.0 | 80.0 | 97.0 |
| | VALUE OF EXPRESSION | | | | | | |
| (3) | fT/f3 | 8.0 | 20.0 | 8.2 | 19.5 | 8.4 | 19.0 |
| | fT | | | | | | |
| | f3 | | | | | | |
| (4) | f1/fW | 15.0 | 30.0 | 15.3 | 28.5 | 15.5 | 27.8 |
| | f1 | | | | | | |
| | fW | | | | | | |
| (5) | f3/fW | 3.5 | 6.5 | 3.7 | 6.2 | 3.8 | 5.8 |
| (6) | fT/f3A | 10.0 | 22.0 | 10.3 | 21.5 | 10.5 | 21.0 |
| | f3A | | | | | | |
| (7) | M3/fW | −11.0 | −4.5 | −10.5 | −4.9 | −10.3 | −5.2 |
| | M3 | | | | | | |
| (8) | M1/fW | −20.0 | −7.5 | −19.7 | −7.8 | −19.4 | −8.0 |
| | M1 | | | | | | |
| (9) | θgF1P | | | | | | |
| (10) | νd1P | 50.0 | 100.0 | 55.0 | 98.0 | 60.0 | 96.0 |
| | VALUE OF EXPRESSION | | | | | | |
| (9) | θgF1P | | | | | | |
| (10) | νd1P | 50.0 | 100.0 | 55.0 | 98.0 | 60.0 | 96.0 |
| | VALUE OF EXPRESSION | | | | | | |
| (11) | νd1N | 30.0 | 50.0 | 33.0 | 45.0 | 35.0 | 42.0 |
| (12) | θgF1N | | | | | | |
| (13) | VALUE OF EXPRESSION | | | | | | |
| (14) | nd | 1.75 | 2.10 | 1.80 | 2.00 | 1.82 | 1.95 |
| (15) | fT/f2 | −40.0 | −20.0 | −39.0 | −21.0 | −37.5 | −21.3 |
| | f2 | | | | | | |
| (16) | fT/MS | −20.0 | −11.0 | −19.0 | −11.8 | −18.5 | −12.0 |
| | MS | | | | | | |
| (17) | MS/M3 | 0.45 | 0.70 | 0.50 | 0.66 | 0.51 | 0.64 |
| | MS | | | | | | |
| | M3 | | | | | | |
| (18) | D2/D3 | 1.0 | 5.0 | 1.3 | 4.5 | 1.5 | 4.0 |
| | D2 | | | | | | |
| | D3 | | | | | | |

| | | | NUMERICAL EXAMPLE | | | | |
|---|---|---|---|---|---|---|---|
| | | | 1 | 2 | 3 | 4 | 5 |
| CONDITIONAL EXPRESSION | (1) | θgF3P | 0.540 | 0.540 | 0.540 | 0.540 | 0.540 |
| | (2) | νd3P | 71.68 | 71.68 | 71.68 | 71.68 | 71.68 |
| | | VALUE OF EXPRESSION | 0.538 | 0.538 | 0.538 | 0.538 | 0.538 |
| | (1) | θgF3P | 0.538 | 0.534 | 0.534 | 0.538 | 0.534 |
| | (2) | νd3P | 81.54 | 90.30 | 94.90 | 81.54 | 90.30 |
| | | VALUE OF EXPRESSION | 0.532 | 0.529 | 0.527 | 0.532 | 0.529 |
| | (3) | fT/f3 | 10.60 | 9.40 | 8.56 | 10.88 | 18.71 |
| | | fT | 208.00 | 208.00 | 208.00 | 208.00 | 340.00 |
| | | f3 | 19.63 | 22.13 | 24.29 | 19.11 | 18.17 |
| | (4) | f1/fW | 15.66 | 18.60 | 18.53 | 17.77 | 27.47 |
| | | f1 | 78.31 | 79.99 | 79.69 | 78.55 | 98.89 |
| | | fW | 5.00 | 4.30 | 4.30 | 4.42 | 3.60 |
| | (5) | f3/fW | 3.93 | 5.14 | 5.65 | 4.32 | 5.05 |
| | (6) | fT/f3A | 10.76 | 12.87 | 12.83 | 10.86 | 20.86 |
| | | f3A | 19.32 | 16.16 | 16.21 | 19.16 | 16.30 |
| | (7) | M3/fW | −5.31 | −6.03 | −6.27 | −6.08 | −10.10 |
| | | M3 | −26.57 | −25.92 | −26.96 | −26.89 | −36.35 |
| | (8) | M1/fW | −8.31 | −10.29 | −10.47 | −9.44 | −19.31 |
| | | M1 | −41.53 | −44.23 | −45.05 | −41.71 | −69.51 |
| | (9) | θgF1P | 0.538 | 0.534 | 0.534 | 0.538 | 0.544 |
| | (10) | νd1P | 81.54 | 94.90 | 94.90 | 81.54 | 68.63 |
| | | VALUE OF EXPRESSION | 0.532 | 0.527 | 0.527 | 0.532 | 0.541 |
| | (9) | θgF1P | 0.538 | 0.544 | 0.544 | 0.538 | 0.534 |
| | (10) | νd1P | 81.54 | 68.63 | 68.63 | 81.54 | 94.90 |
| | | VALUE OF EXPRESSION | 0.532 | 0.541 | 0.541 | 0.532 | 0.527 |
| | (11) | νd1N | 35.25 | 37.20 | 37.20 | 35.25 | 40.80 |
| | (12) | θgF1N | 0.582 | 0.578 | 0.578 | 0.582 | 0.567 |
| | (13) | VALUE OF EXPRESSION | 0.655 | 0.655 | 0.655 | 0.655 | 0.655 |

TABLE 1-continued

| | | | | | | |
|---|---|---|---|---|---|---|
| (14) | nd | 1.91082 | 1.83400 | 1.83400 | 1.91082 | 1.88300 |
| (15) | fT/f2 | −21.49 | −22.49 | −22.73 | −22.48 | −37.19 |
| | f2 | −9.68 | −9.25 | −9.15 | −9.25 | −9.14 |
| (16) | fT/MS | −13.64 | −13.70 | −12.65 | −12.24 | −18.06 |
| | MS | −15.25 | −15.18 | −16.44 | −16.99 | −18.80 |
| (17) | MS/M3 | 0.57 | 0.59 | 0.61 | 0.63 | 0.52 |
| | MS | −15.25 | −15.18 | −16.44 | −16.99 | −18.80 |
| | M3 | −26.57 | −25.92 | −26.96 | −26.89 | −36.35 |
| (18) | D2/D3 | 3.00 | 3.35 | 3.43 | 3.60 | 1.66 |
| | D2 | 33.93 | 34.26 | 34.33 | 35.95 | 29.12 |
| | D3 | 11.32 | 10.24 | 10.02 | 9.99 | 17.55 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2012-115551, filed on May 21, 2012, and Japanese Patent Application No. 2012-115552, filed on May 21, 2012, which are hereby incorporated by reference herein in their entirety.

What is claimed is:

1. A zoom lens capable of changing a distance between adjacent lens units in zooming, the zoom lens comprising:
in order from an object side to an image side,
a first lens unit having a positive refractive power;
a second lens unit having a negative refractive power;
an aperture stop;
a third lens unit having a positive refractive power; and
a rear lens group including at least one lens unit,
wherein the first lens unit is positioned closer to the object side at a telephoto end than at a wide-angle end,
wherein the third lens unit includes positive lenses, materials of the positive lenses included in the third lens unit satisfy the following expression:

$$\theta gF3P - (-1.665 \times 10^{-7} \cdot vd3P^3 + 5.213 \times 10^{-5} \cdot vd3P^2 - 5.656 \times 10^{-3} \cdot vd3P + 0.737) > 0$$

$$50.0 < vd3P < 100.0, \text{ and}$$

wherein the following conditional expressions are satisfied:

$$8.0 < fT/f3 < 20.0$$

$$15.0 < f1/fW < 30.0$$

where $\theta gF3P$ is a partial dispersion ratio of material of at least one of the positive lenses in the third lens unit, vd3P is Abbe's number of at least one of the positive lenses, fW and fT are focal lengths of a total system at the wide-angle end and at the telephoto end respectively, f1 is a focal length of the first lens unit, and f3 is a focal length of the third lens unit.

2. The zoom lens according to claim 1, wherein the following conditional expression is satisfied:

$$3.5 < f3/fW < 6.5.$$

3. The zoom lens according to claim 1,
wherein the third lens unit includes a positive lens that is closest to the object side, and
wherein the following conditional expression is satisfied:

$$10.0 < fT/f3A < 22.0,$$

where f3A is a focal length of the positive lens.

4. The zoom lens according to claim 1, wherein the following conditional expression is satisfied:

$$-11.0 < M3/fW < -4.5$$

where M3 is a moving amount of the third lens unit in zooming from the wide-angle end to the telephoto end.

5. The zoom lens according to claim 1, wherein the following conditional expression is satisfied:

$$-20.0 < M1/fW < -7.5$$

where M1 is a moving amount of the first lens unit in zooming from the wide-angle end to the telephoto end.

6. The zoom lens according to claim 1,
wherein the first lens unit is configured by three lenses including at least one positive lens, and
wherein the following conditional expressions are satisfied:

$$\theta gF1P - (-1.665 \times 10^{-7} \cdot vd1P^3 + 5.213 \times 10^{-5} \cdot vd1P^2 - 5.656 \times 10^{-3} \cdot vd1P + 0.737) > 0$$

$$50.0 < vd1P < 100.0$$

where $\theta gF1P$ is a partial dispersion ratio of a material of the at least one positive lens in the first lens unit, vd1P is Abbe's number of the at least one positive lens.

7. The zoom lens according to claim 1,
wherein the first lens unit includes at least one negative lens, and
wherein the following conditional expressions are satisfied:

$$30.0 < vd1N < 50.0$$

$$0.52 < \theta gF1N$$

$$\theta gF1N < -0.00203 \times vd1N + 0.656$$

where $\theta gF1N$ is a partial dispersion ratio of a material of the at least one negative lens in the first lens unit, vd1N is Abbe's number of the at least one negative lens.

8. The zoom lens according to claim 1,
wherein the first lens unit includes at least one negative lens, and
wherein the following conditional expression is satisfied:

$$1.75 < nd < 2.10$$

where nd is a refractive index of a material of the at least one negative lens.

9. The zoom lens according to claim 1, wherein the following conditional expression is satisfied:

$$-40.0 < fT/f2 < -20.0$$

where f2 is a focal length of the second lens unit.

10. The zoom lens according to claim 1, wherein the following conditional expression is satisfied:

$$-20.0 < fT/MS < -11.0$$

where MS is a moving amount of the aperture stop in zooming from the wide-angle end to the telephoto end.

11. The zoom lens according to claim 1, wherein the following conditional expression is satisfied:

$$0.45 < MS/M3 < 0.70$$

where M3 and MS are moving amounts of the third lens unit and the aperture stop in zooming from the wide-angle end to the telephoto end.

12. The zoom lens according to claim 1, wherein the following conditional expression is satisfied:

$$1.0 < D2/D3 < 5.0$$

where D2 is a distance from a lens surface closest to the image side of the second lens unit to the aperture stop at the wide-angle end, and D3 is a distance from the aperture stop to a lens surface closest to the object side of the third lens unit at the wide-angle end.

13. The zoom lens according to claim 1, wherein the first lens unit moves to the object side after moving to the image side in zooming from the wide-angle end to the telephoto end.

14. The zoom lens according to claim 1, wherein a lens unit closest to the image side moves to the object side in focusing from an object at infinity to an object at a short distance.

15. The zoom lens according to claim. 1, wherein the rear lens group is, in order from the object side to the image side, configured by a fourth lens unit having a negative refractive power and a fifth lens unit having a positive refractive power.

16. The zoom lens according to claim 1, wherein the rear lens group is configured by a fourth lens unit having a positive refractive power.

17. The zoom lens according to claim. 1, wherein the rear lens group is, in order from the object side to the image side, configured by a fourth lens unit having a positive refractive power and a fifth lens unit having a positive refractive power.

18. An image pickup apparatus comprising:
a zoom lens; and
a photoelectric conversion element configured to receive light of an image formed by the zoom lens,
wherein the zoom lens is capable of changing a distance between adjacent lens units in zooming, and
wherein the zoom lens comprises, in order from an object side to an image side,
a first lens unit having a positive refractive power;
a second lens unit having a negative refractive power;
an aperture stop;
a third lens unit having a positive refractive power; and
a rear lens group including at least one lens unit,
wherein the first lens unit is positioned closer to the object side at a telephoto end than at a wide-angle end,
wherein the third lens unit includes positive lenses, materials of the positive lenses included in the third lens unit satisfy the following expression:

$$\theta gF3P - (-1.665 \times 10^{-7} \cdot vd3P^3 + 5.213 \times 10^{-5} \cdot vd3P^2 - 5.656 \times 10^{-3} \cdot vd3P + 0.737) > 0$$

$$50.0 < vd3P < 100.0, \text{ and}$$

wherein the following conditional expressions are satisfied:

$$8.0 < fT/f3 < 20.0$$

$$15.0 < f1/fW < 30.0$$

where $\theta gF3P$ is a partial dispersion ratio of material of at least one of the positive lenses in the third lens unit, vd3P is Abbe's number of at least one of the positive lenses, fW and fT are focal lengths of a total system at the wide-angle end and at the telephoto end respectively, f1 is a focal length of the first lens unit, and f3 is a focal length of the third lens unit.

19. A zoom lens capable of changing a distance between adjacent lens units in zooming, the zoom lens comprising:
in order from an object side to an image side,
a first lens unit having a positive refractive power;
a second lens unit having a negative refractive power;
an aperture stop;
a third lens unit having a positive refractive power; and
a rear lens group including at least one lens unit,
wherein the first lens unit and the aperture stop are positioned closer to the object side at a telephoto end than at a wide-angle end,
wherein the third lens unit includes positive lenses, materials of the positive lenses included in the third lens unit satisfy the following expression:

$$\theta gF3P - (-1.665 \times 10^{-7} \cdot vd3P^3 + 5.213 \times 10^{-5} \cdot vd3P^2 - 5.656 \times 10^{-3} \cdot vd3P + 0.737) > 0$$

$$50.0 < vd3P < 100.0, \text{ and}$$

wherein the following conditional expression is satisfied:

$$8.0 < fT/f3 < 20.0$$

where $\theta gF3P$ is a partial dispersion ratio of material of at least one of the positive lenses in the third lens unit, vd3P is Abbe's number of at least one of the positive lenses, fT is a focal length of a total system at the telephoto end, and f3 is a focal length of the third lens unit.

20. An image pickup apparatus comprising:
a zoom lens; and
a photoelectric conversion element configured to receive light of an image formed by the zoom lens,
wherein the zoom lens is capable of changing a distance between adjacent lens units in zooming, and
wherein the zoom lens comprises, in order from an object side to an image side,
a first lens unit having a positive refractive power;
a second lens unit having a negative refractive power;
an aperture stop;
a third lens unit having a positive refractive power; and
a rear lens group including at least one lens unit,
wherein the first lens unit and the aperture stop are positioned closer to the object side at a telephoto end than at a wide-angle end,
wherein the third lens unit includes positive lenses, materials of the positive lenses included in the third lens unit satisfy the following expression:

$$\theta gF3P - (-1.665 \times 10^{-7} \cdot vd3P^3 + 5.213 \times 10^{-5} \cdot vd3P^2 - 5.656 \times 10^{-3} \cdot vd3P + 0.737) > 0$$

$$50.0 < vd3P < 100.0, \text{ and}$$

wherein the following conditional expression is satisfied:

$$8.0 < fT/f3 < 20.0$$

where $\theta gF3P$ is a partial dispersion ratio of material of at least one of the positive lenses in the third lens unit, vd3P is Abbe's number of at least one of the positive lenses, fT is a focal length of a total system at the telephoto end, and f3 is a focal length of the third lens unit.

* * * * *